United States Patent [19]

Ishikawa

[11] Patent Number: 5,532,432
[45] Date of Patent: Jul. 2, 1996

[54] CONTROL UNIT, PLUG-IN UNIT, TRANSFORMER, ZERO-PHASE CURRENT TRANSFORMER, AND FREQUENCY MEASURING CIRCUIT APPLIED TO CONTROL CENTER

[75] Inventor: Masahiro Ishikawa, Kagawa, Japan

[73] Assignee: Mitsubishi Denki Kabushiki, Tokyo, Japan

[21] Appl. No.: 404,580

[22] Filed: Mar. 15, 1995

Related U.S. Application Data

[62] Division of Ser. No. 265,795, Jun. 27, 1994.

[30] Foreign Application Priority Data

Sep. 29, 1993 [JP] Japan .................................. 5-242815
Mar. 15, 1994 [JP] Japan .................................. 6-44109

[51] Int. Cl.⁶ .............................. H02G 3/08; H02B 1/08
[52] U.S. Cl. .................. 174/60; 200/50.21; 361/608; 361/622; 439/687
[58] Field of Search .................................. 439/586, 620, 439/682, 686, 687, 695, 696, 701; 174/52.1, 53, 59, 60; 200/293, 303, 50 AA, 51 R; 361/724, 725, 727, 605, 607, 608, 611, 614, 622

[56] References Cited

U.S. PATENT DOCUMENTS

| | | |
|---|---|---|
| 4,178,624 | 12/1979 | Wilson . |
| 4,380,785 | 4/1983 | Demeyer . |
| 4,502,097 | 2/1985 | Takahashi .......................... 361/342 |
| 4,602,313 | 7/1986 | Takahashi . |
| 4,621,303 | 11/1986 | Rowe ................................. 361/338 |

FOREIGN PATENT DOCUMENTS

| | | |
|---|---|---|
| 53-99418 | 8/1978 | Japan . |
| 57-12545 | 3/1982 | Japan . |
| 61-41306 | 3/1986 | Japan . |

Primary Examiner—Gerald P. Tolin
Attorney, Agent, or Firm—Burns, Doane, Swecker & Mathis

[57] ABSTRACT

A control unit forms a control center serving as one type of a control panel in an electric power system control system. The control unit accommodates equipments such as a circuit breaker, an electromagnetic switch, a zero-phase current transformer, and an operating transformer, and includes a substantially Z-shaped equipment mounting plate mounted between side plates of the unit to have an intermediate bent portion. The circuit breaker is disposed on a front face of a front mounting portion of the equipment mounting plate, and the current transformer is disposed on a back face thereof. The electromagnetic switch is disposed on a front face of a back mounting portion of the equipment mounting plate, and the thin operating transformer is isolated from other equipments and disposed on a back face thereof. Mounting the thin operating transformer on the back face of the back mounting portion of the equipment mounting plate causes the control unit to contain a bulk electromagnetic switch and other equipments without increasing a control unit size. Further, since the operating transformer is isolated from other equipments, other equipments are never affected in the event of burning accident.

4 Claims, 23 Drawing Sheets

FIG. 19
(PRIOR ART)
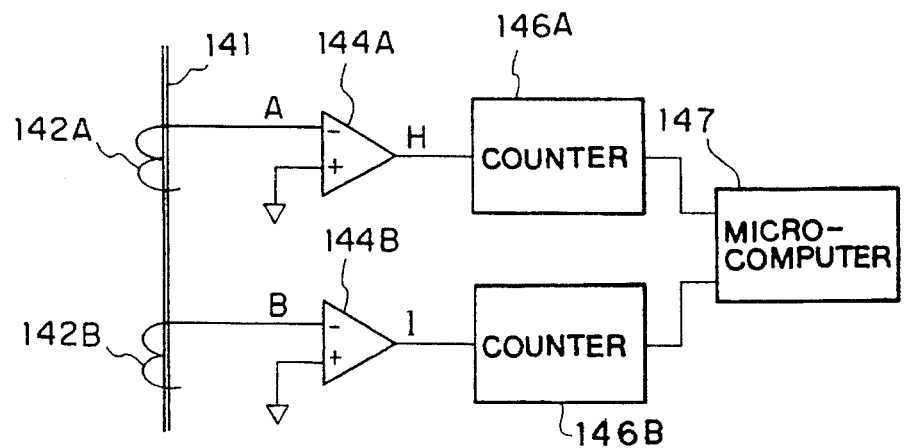
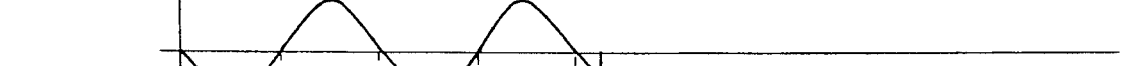
FIG.20(A)
(PRIOR ART)
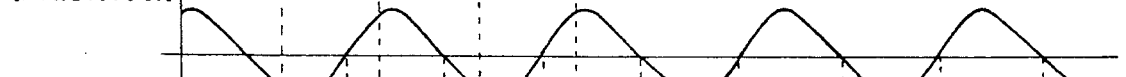
FIG.20(B)
(PRIOR ART)
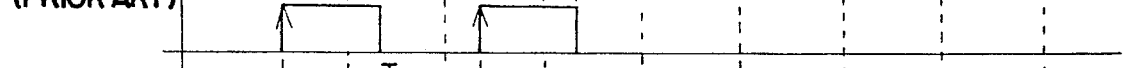
FIG.20(H)
(PRIOR ART)
FIG.20(I)
(PRIOR ART)

FIG. 46
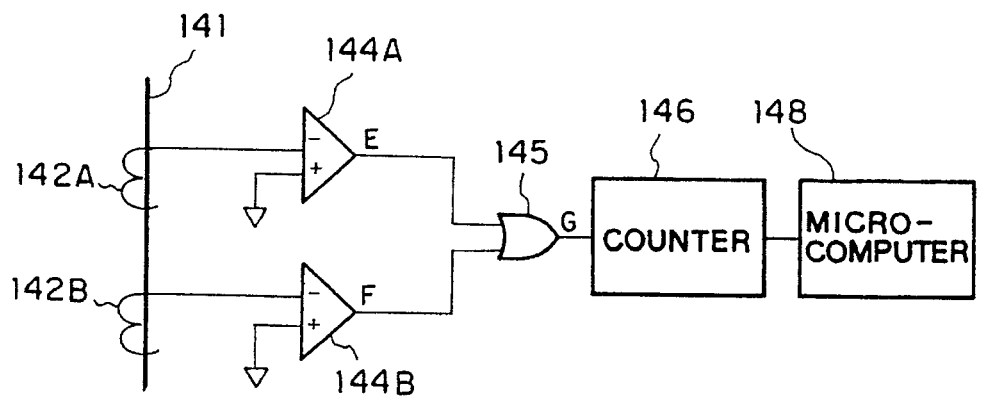
FIG.47(A)
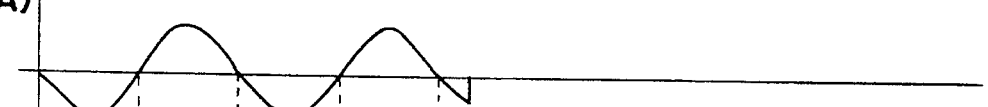
FIG.47(E)
FIG.47(B)
FIG.47(F)
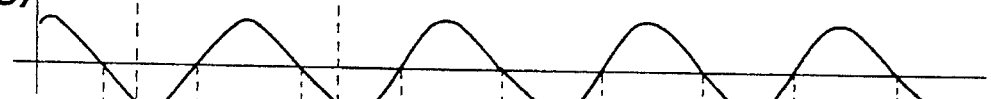
FIG.47(G)
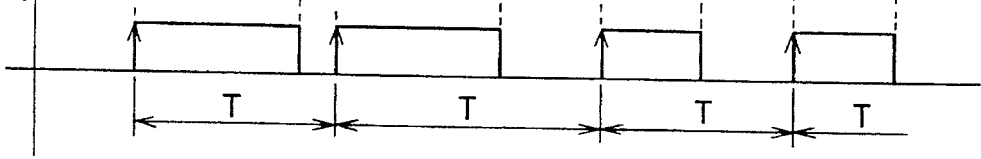

CONTROL UNIT, PLUG-IN UNIT, TRANSFORMER, ZERO-PHASE CURRENT TRANSFORMER, AND FREQUENCY MEASURING CIRCUIT APPLIED TO CONTROL CENTER

This application is a divisional of application Ser. No. 08/265,795, filed Jun. 27, 1994.

BACKGROUND OF THE INVENTION

1. Field of the Invention

The present invention relates to a control unit, a plug-in unit, a transformer, a zero-phase current transformer, and a frequency measuring circuit which are preferably applied to a control center serving as a type of console in a control system for an electric power system.

2. Description of the Prior Art

FIG. 1 is a perspective view showing an appearance of a control center. The control center includes a plurality of control units 200 layered in a control center box 300. FIG. 2 is a perspective view of the control unit 200 as seen from a front face thereof, FIG. 3 is a perspective view as seen from a back face thereof, and FIG. 4 is a plan view as seen downward. Further, FIG. 5 is a sectional view taken along a line V—V of FIG. 1, showing the control center box 300. As shown in each drawing, side plates 1 and 2 are provided on both sides of the control units 200. A front transverse member 3 is disposed on the front side of a top of the side plates 1, 2, and a back transverse member 4 is disposed on the back side of the top thereof. A power source grip 5 is attached to the back transverse member 4.

A substantially Z-shaped equipment mounting plate 6 is disposed between the side plates 1 and 2 for attachment of various equipment. A circuit breaker 7 is attached to a left-side mounting portion of the equipment mounting plate on the front side of the control unit 200, and an operating transformer 10 having a substantially cubic structure and a current transformer 11 are attached thereto on the back side of the control unit 200. The operating transformer 10 serves as a power source for control in the control unit 200. An electromagnetic switch 8 and a current sensor 9 are attached to a right-side mounting portion on the front side of the control unit 200, and a zero-phase current transformer 12 is attached thereto on the back side of the control unit 200 to transform zero-phase current in line current. A guide rail 50 is attached to each outside of the side plates 1 and 2. Further, an operating handle 13 is attached to the front side of the unit to control the circuit breaker 7, and a terminal block 14 for control wiring is also attached to the front side of the unit.

As shown in FIG. 5, the control unit 200 is mounted in a housing 61 of the control center box 300 to have a unit door 62 on the front side thereof. A vertical bus 69 contacts the power source grip 5 to feed power to each control unit 200. The vertical bus 69 extends vertically in the control center box 300. In general, as shown in FIG. 6, main circuit wiring is established in the control unit 200 in the order of the power source grip 5, the circuit breaker 7, the current transformer 11, the current sensor 9, the zero-phase current transformer 12, and the electromagnetic switch 8.

FIG. 7 is a front view showing a mounting portion of the conventional power source grip 5, that is, the plug-in unit. FIG. 8 is a plan view partially broken away of the plug-in unit, and FIG. 9 is a sectional view taken along a line IX—IX of FIG. 8. FIG. 10 is a perspective view of the control unit 200, illustrating a plug-in unit portion in detail.

FIG. 11 is a plan view of the control unit 200 shown in FIG. 10. An overcurrent relay 42 is also indicated in FIG. 10.

The plug-in unit includes a first insulating case 41, an elongatedly cover-shaped second insulating case 42 in which the first insulating case 41 is fitted, a lead wire 44, and a terminal 45. Three prismatic portions 41a and a connecting substrate portion 41b are integrally mounted to form the first insulating case 41. Three prismatic portions 41a respectively realize the power source grip 5. The prismatic portion 41a includes a square hole-shaped chamber 41c, and an extending rod 41d vertically extends in the prismatic portion 41a through the chamber 41c. The prismatic portion 41a contains a U-shaped contact 43 having elasticity. The U-shaped contact 43 includes a base portion 43a, a pair of contact legs 43b upward extending in parallel from the base portion 43a to be inwardly inclined in the course of the extension, and a distal end 43c whose distal end is curved to outwardly extend. A flange portion 41e is mounted on a periphery of the connecting substrate portion 41b. Further, a mounting hole 41f is provided in the connecting substrate portion 41b.

An end surface of a cylindrical extending portion 41g of the first insulating case 41 contacts an inner bottom surface 42a of the cover-shaped second insulating case 42. A side portion 42b of the second insulating case 42 contacts side surfaces of the flange portion 41e and the extending portion 41g. In this way, the first insulating case 41 is fitted with the second insulating case 42. In this case, the base portion 43a of the U-shaped contact 43 contacts the inner bottom surface 42a of the second insulating case 42. An extending portion 42c extends from the second insulating case 42 on the side opposite to the inner bottom surface 42a. A through-hole 42d is provided in the extending portion 42c. Further, a concave groove portion 42e is provided in the second insulating case 42 at a position to contact the U-shaped contact 43. Further, a mounting hole 42f is provided in a bottom portion of the second insulating case 42.

One end of the lead wire 44 is connected to the outside of the base portion 43a of the contact 43 by resistance welding, and the other end is connected to the terminal 45 with pressure.

A description will now be given of an assembling method of the plug-in unit. First, the contact 43 is inserted into the chamber 41c from the side of the extending portion 41g of the first insulating case 41. Next, the lead wire 44 passes through the through-hole 42d of the second insulating case 42, and thereafter the first insulating case is fitted with the second insulating case 43.

The lead wire 44 exits the plug-in unit assembled as set forth above to pass through a through-hole 6a in the mounting plate 6. The plug-in unit is inserted into a concave portion 4a provided in the back transverse member 4. Further, a fixing screw 53 is screwed into the mounting holes 6b, 42f, 41f, and 4b. The mounting hole 6b is provided in the mounting plate 6. The lead wire 44 is bundled by a wire bundling member 54. The terminal 45 is secured to the circuit breaker 7.

FIG. 12 is a top view of a conventional operating transformer 10, FIG. 13 is a left side view thereof, and FIG. 14 is a plan view thereof. In the respective drawings, reference numeral 98 means a primary coil, 99 is a secondary coil, and 100 is a tertiary coil. Reference numeral 101 means a terminal of each of the coils 98, 99, and 100, and 102 is a core. Specifically, reference numeral 102a means a top core, and 102b is a bottom core. The core 102 is formed by laminating plates punched out from a thin plate. Reference numeral 103 means a pressing plate which is disposed on both sides of the core 102, and the pressing plate 103 is fixed on the core 102 by a screw 104 to maintain a compression state of the core 102. Reference numeral 103a means a mounting leg formed by folding a bottom portion of the pressing plate 103 to have an L-shaped structure. A notch portion 103b is provided in the mounting leg 103a, and a screw passes through the notch portion 103b to fix the operating transformer 10.

FIG. 15 is a connection diagram showing an exemplary connection in the operating transformer 10. Voltage of 200 or 400 V is applied across U–V1, or U–2V of the primary coil 98. Then, voltage of 100 V can be derived from between 1u–1v or 2u–2v of the secondary coil 99, and voltage of 18 V can be derived from between a–b of the tertiary coil 100.

As shown in FIGS. 12 to 14, the primary coil 89, the secondary coil 99, and the tertiary coil 100 are layered. Therefore, a height H of the operating transformer 10 is equal to a number obtained by adding the sum of heights of three coils to the heights of the top core 102a and the bottom core 102b.

FIG. 16 is a front view showing a conventional zero-phase current transformer 12. FIG. 17 is a sectional view taken along a line XVII—XVII of FIG. 16. Here, a circular zero-phase current transformer is shown.

As shown in the drawing, the circular zero-phase current transformer includes an annular coil portion 130, and a cable inserting aperture 139a serving as a space inside the coil portion 130. The coil portion 130 includes an annular core 134 made of a magnetic material having high magnetic permeability, a vibration isolating material 135 covering the core 134, a containing case 136 containing the core 134 and the vibration isolating material 135, a winding (secondary winding) wound on the containing case 136, and an insulating material 138 covering the winding 137.

Three-phase lines (primary conductor) 132a, 132b, and 132c corresponding to a primary winding pass through the cable inserting aperture 139a. Signal voltage according to ac current in the primary conductors 132a, 132b, and 132c is outputted through magnetic coupling to a lead wire 133 connected to the winding 137.

When the above circular zero-phase current transformer is mounted in the control unit or the like, the control unit or the like requires a space according to an outer dimension of the circular zero-phase current transformer. In a case where the space in the control unit or the like is limited, a track type zero-phase current transformer may be employed. In the track type zero-phase current transformer, three primary conductors 132a, 132b, and 132c are inserted into the cable inserting aperture 139a to be aligned with each other.

FIG. 19 is a block diagram showing a structure of a conventional frequency measuring circuit which is applied to the control unit and so forth. In the drawing, reference numeral 141 designates a line, 142A and 142B are voltage transformers respectively taking voltage having each different phase in the line 141, 144A is a first comparator to convert A-phase input voltage from the voltage transformer 142A into a rectangular wave, and 144B is a second comparator to convert B-phase input voltage from the voltage transformer 142B into the rectangular wave. Reference numeral 146A designates a counter to count a time for one period of the rectangular wave outputted from the first comparator 144A, 146B is a counter to count a time for one period of the rectangular wave outputted from the second comparator 144B, and 147 is a microcomputer to compute a frequency depending upon counted values of the counters 146A and 146B.

A description will now be given of the operation with reference to a timing diagram of FIG. 20. For example, an A-phase and a B-phase are deviated with a phase difference of 60 degrees. The frequency measuring circuit measures a frequency of one phase, for example, the A-phase. That is, an input port of the microcomputer 147 is connected to the counter 146A so as to receive the counted value of the counter 146A as input. The A-phase input voltage serving as sine-wave voltage as shown in FIG. 20(A) is fed to one input terminal of the first comparator 144A from the voltage transformer 142A. Reference voltage is fed to the other input terminal of the first comparator 144A. The reference voltage means voltage, for example, corresponding to voltage at a zero-cross point of the input voltage. In the following description, it must be noted that the first comparator 144A provides a high level output when an instantaneous value of the A-phase input voltage is greater than the reference value as shown in FIG. 20(H).

The counter 146A counts a reference clock to feed the microcomputer 147 with a counted value for a period from a rise to the next rise of output from the first comparator 144A. That is, the counted value corresponds to the period of the A-phase input voltage. The microcomputer 147 obtains the period of the A-phase input voltage depending upon the counted value from the counter 146A, and a frequency of the reference clock fed to the counter 146A. Further, the microcomputer 147 can obtain a frequency of the A-phase input voltage, which is the reciprocal of the period.

In a case where the A-phase voltage is interrupted due to occurrence of accident and so forth, if the other phase is available, it is necessary to continue frequency measurement of line voltage with respect to the available phase. Therefore, in such a case, the input port of the microcomputer 147 is switched over to the counter 146B on the side of the B-phase as another input source. The second comparator 144B is operated as in the case of the first comparator 144A to output a rectangular wave of a frequency corresponding to a frequency of the B-phase input voltage. The counter 146B is operated as in the case of the counter 146A to output a counted value corresponding to a period of the B-phase input voltage. Thus, the microcomputer 147 continues the frequency measurement with respect to the B-phase input voltage. As set forth above, the frequency measuring circuit can carry out the frequency measurement by using the dual input to the microcomputer 147, that is, after the measuring object is switched over to the available phase at a time of the accident.

Japanese Patent Publication (Kokai) No. 5-273265 discloses a frequency measuring circuit to measure the frequency after binarization of the input voltage by the comparator.

In the conventional control unit 200, wiring is established as shown in FIG. 6, that is, in the order of the power source grip 5, the circuit breaker 7, the current transformer 11, the current sensor 9, the zero-phase current transformer 12, and the electromagnetic switch 8. Thus, there is a complicated wiring path as shown in FIG. 4, resulting in an extremely defective operational efficiency. Further, since the zero-phase current transformer 12 is attached to a right-side back face of the mounting plate 6 in the unit, a limitation is imposed on a depth dimension of the electromagnetic switch 8 attached to a right-side front face of the mounting plate 6. As a result, the control unit 200 can not accommodate a bulk electromagnetic switch 8. It is necessary to extend a size of the control unit 200 so as to contain control equipments such as electromagnetic relay. Further, since the operating transformer 10 and the current transformer 11 are attached to a left-side surface of the mounting plate 6, a burning accident of the operating transformer 10 may result in burning of the current transformer 11.

Since the conventional plug-in unit is provided as shown in FIGS. 7 to 9, it is possible to pass the lead wire 44 through the insulating cases 41, 42 in assembly. The terminal 45 can not be attached before the lead wire 44 passes through the insulating cases. Further, when the plug-in unit is attached to the control unit 200, the lead wire 44 must pass through the through-hole 6a of the mounting plate 6. That is, an operational efficiency is extremely defective. Besides, there is a problem in that a space to mount each equipment is reduced since the lead wire 44 and the passing members extend from a surface of the mounting plate 6.

As shown in FIG. 5, a dimension in a depth direction of the control unit 200 is defined by the sum of a height of the circuit breaker 7 and a height of the operating transformer 10. Consequently, the most downsized possible operating transformer 10 has been desired in order to downsize the control unit 200, and reduce an area required for mounting.

The track type zero-phase current transformer 12 requires a more reduced height in the space required for mounting than that in case of using the circular zero-phase current transformer. However, in this case, since a width in the required space is more increased so that the mounting may be difficult. In addition, since the primary conductors 132a, 132b, and 132c are in alignment with each other, a balance characteristic required for the zero-phase current transformer may be deteriorated.

The conventional frequency measuring circuit requires the counters 146A and 146B corresponding to the respective phases. Additionally, there is another problem in that the input port of the microcomputer 147 should be switched over to another input source after detecting that voltage having a currently measured phase is interrupted.

SUMMARY OF THE INVENTION

The present invention is made to overcome the foregoing problems, it is an object of the present invention to provide a control unit, a plug-in unit, a transformer, a zero-phase current transformer, and a frequency measuring circuit which can provide a more downsized control unit, or provide a higher-performance control unit having the same size as that of a conventional unit, and can simplify assembly of the control unit.

It is a more specific object of the present invention to provide a control unit which can enhance an operational efficiency of wiring, and can contain a bulk electromagnetic switch and other equipments without increasing its size. Further, it is another object of the present invention to provide a control unit in which other equipments are never affected in the event of burning accident of an operating transformer.

It is still another object of the present invention to provide a plug-in unit which can be easily assembled, and can extend an equipment mounting space in a control unit. It is a further object of the present invention to provide an operating transformer having a reduced height dimension. It is a still further object of the present invention to provide a zero-phase current transformer reduced in height and width.

It is a further object of the present invention to provide a frequency measuring circuit which can form a counting portion serving as frequency computing means by one counter, and can continue a frequency measuring control without controlling an input port of a microcomputer forming the frequency computing means to be switched over to another input source.

According to one aspect of the present invention, for achieving the above-mentioned objects, there is provided a control unit in which a circuit breaker is disposed on a front face of a front mounting portion of an equipment mounting plate and a current transformer is disposed on a back face thereof, an electromagnetic switch is disposed on a front face of a back mounting portion of the equipment mounting plate, and a thin operating transformer is isolated from other equipments and disposed on a back face thereof.

According to another aspect of the present invention, there is provided a control unit in which a current transformer, a current sensor, and a zero-phase current transformer are laterally arranged and mounted on a back face of a front mounting portion of an equipment mounting plate.

According to still another aspect of the present invention, there is provided a control unit including a thin operating transformer having a more reduced depth dimension than that of a zero-phase current transformer.

According to the present invention, the plug-in unit is provided with a first insulating case having a plurality of prismatic chambers to contain contacts, and a second insulating case fitted with the first insulating case so as to form a wiring chamber between the first and the second insulating chambers to extend in a direction perpendicular to a direction of extension of the prismatic chamber. One lead wire exit is provided in side surfaces of the two insulating cases to be communicated with the wiring chamber.

According to another aspect of the present invention, an extending washer is provided around a fixing screw hole in a surface of the plug-in unit on the side fixed on the equipment mounting plate.

According to the present invention, an operating transformer is provided with a core formed by layering thin plates and having two through-holes mutually extending parallel to a layering direction, a first coil wound through the two through-holes, and a second coil positioned on the outside of the first coil and disposed concentrically and coplanarly with the first coil.

According to another aspect of the present invention, in an operating transformer, a first coil and a second coil are respectively wound on annular bobbins having a channel-shaped section, and an inside bobbin is fitted into an internal diameter portion of an outside bobbin.

According to still another aspect of the present invention, an operating transformer is provided with a connecting portion disposed at a side portion of a coil, and a lead line from the coil and an external outgoing line are connected in the connecting portion.

According to a further aspect of the present invention, an operating transformer is provided with a terminal block disposed at a side portion of a coil to connect a lead line from the coil to an external outgoing line.

According to a further aspect of the present invention, an operating transformer has pressing plates disposed at both ends of a core in a layering direction, and a side portion of the core is linearly connected to the pressing plate by welding.

According to a further aspect of the present invention, an operating transformer is provided with a contacting plate extending at least between pressing plates at both ends and contacting at least one side portion of a core.

According to the present invention, in a zero-phase current transformer, a core and a cable inserting aperture have a substantially regular triangle-shaped section.

According to the present invention, a frequency measuring circuit is provided with period signal generating means for generating a signal indicating a period starting point of a signal corresponding to a synthesized signal of electromotive forces having desired two phases in a polyphase electric power system, and frequency computing means for computing a frequency of the electric power system by using the signal generated by the period signal generating means.

According to another aspect of the present invention, in a frequency measuring circuit, period signal generating means includes an adder to add electromotive forces having desired two phases, and a comparator to compare output from the adder with a reference signal for binarization, and feed a binary signal to frequency computing means.

According to another aspect of the present invention, in a frequency measuring circuit, period signal generating means is provided with a first comparator to compare one of electromotive forces having desired two phases with a reference signal for binarization, a second comparator to compare the other of the electromotive forces having the desired two phases with the reference signal for binarization, and an OR circuit in which output from the first comparator and output from the second comparator are ORed to feed the OR signal to frequency computing means.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 19 is a block diagram showing a structure of a conventional frequency measuring circuit applied to the control unit and so forth;

FIG. 20 is a timing diagram showing a signal waveform for each part in the conventional frequency measuring circuit;

FIG. 46 is a block diagram showing a structure of a frequency measuring circuit according to the embodiment 6 of the present invention; and FIG. 47 is a timing diagram showing a signal waveform for each part in the frequency measuring circuit according to the embodiment 6.

DETAILED DESCRIPTION OF THE PREFERRED EMBODIMENTS

Preferred embodiments of the invention will now be described in detail referring to the accompanying drawings.

Embodiment 1

Figure 21:
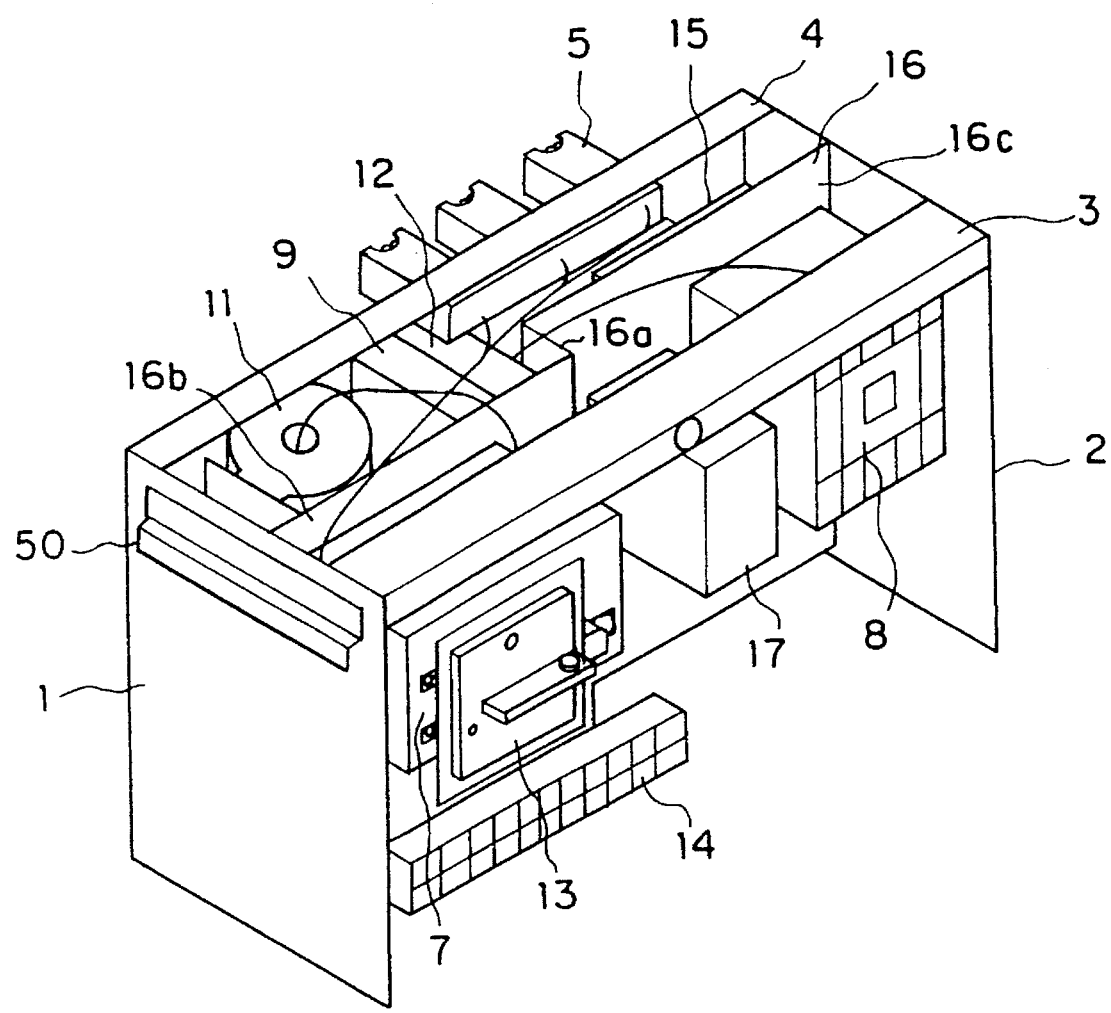
FIG. 21 is a perspective view as seen from a front face of a control unit according to the embodiment 1 of the present invention.
Figure 22:
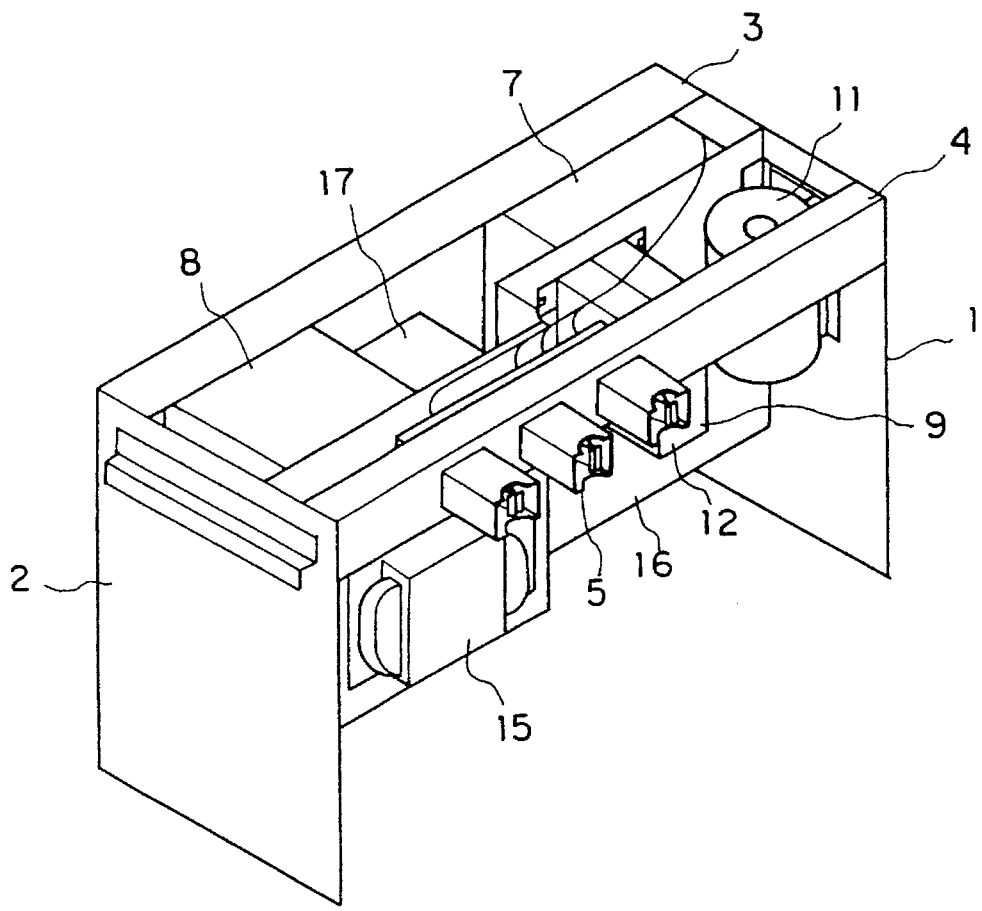
FIG. 22 is a perspective view as seen from a back face of the control unit according to the embodiment 1 of the present invention.
Figure 23:
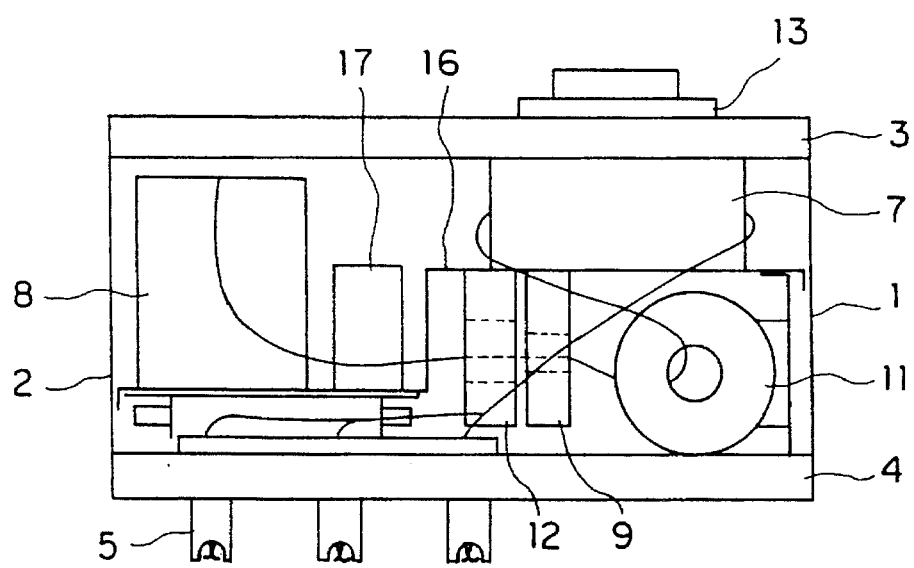
FIG. 23 is a plan view of the control unit.
Figure 24:
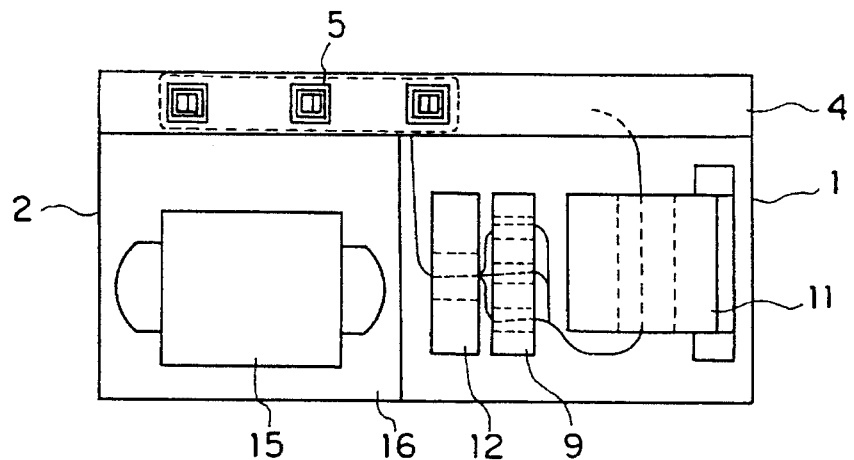
FIG. 24 is a back face view of the control unit.

FIG. 21 is a perspective view as seen from a front face of a control unit according to the embodiment 1 of the present invention, and FIG. 22 is a perspective view as seen from a back face thereof. FIG. 23 is a plan view of the control unit, and FIG. 24 is a back face view of the control unit. As shown in the respective drawings, an equipment mounting plate 16 is disposed between right and left side plates 1 and 2, and is provided with a bent portion 16a at an intermediate portion thereof to have a substantially Z-shaped structure. The bent portion 16a is longer than a conventional bent portion. Further, the equipment mounting plate 16 is disposed in the unit at a deeper position than a conventional mounting position.

A circuit breaker 7 is attached to a front face of a left-side mounting portion 16b of the equipment mounting plate 16, and a current transformer 11, a current sensor 9, and a zero-phase current transformer 12 are laterally arranged and attached to a back face thereof. An electromagnetic switch 8 and an electromagnetic relay 17 are attached to a front face of a right-side mounting portion 16c of the equipment mounting plate 16, and a thin operating transformer 15 is isolated from other equipments and attached to a back face thereof.

Figure 1:
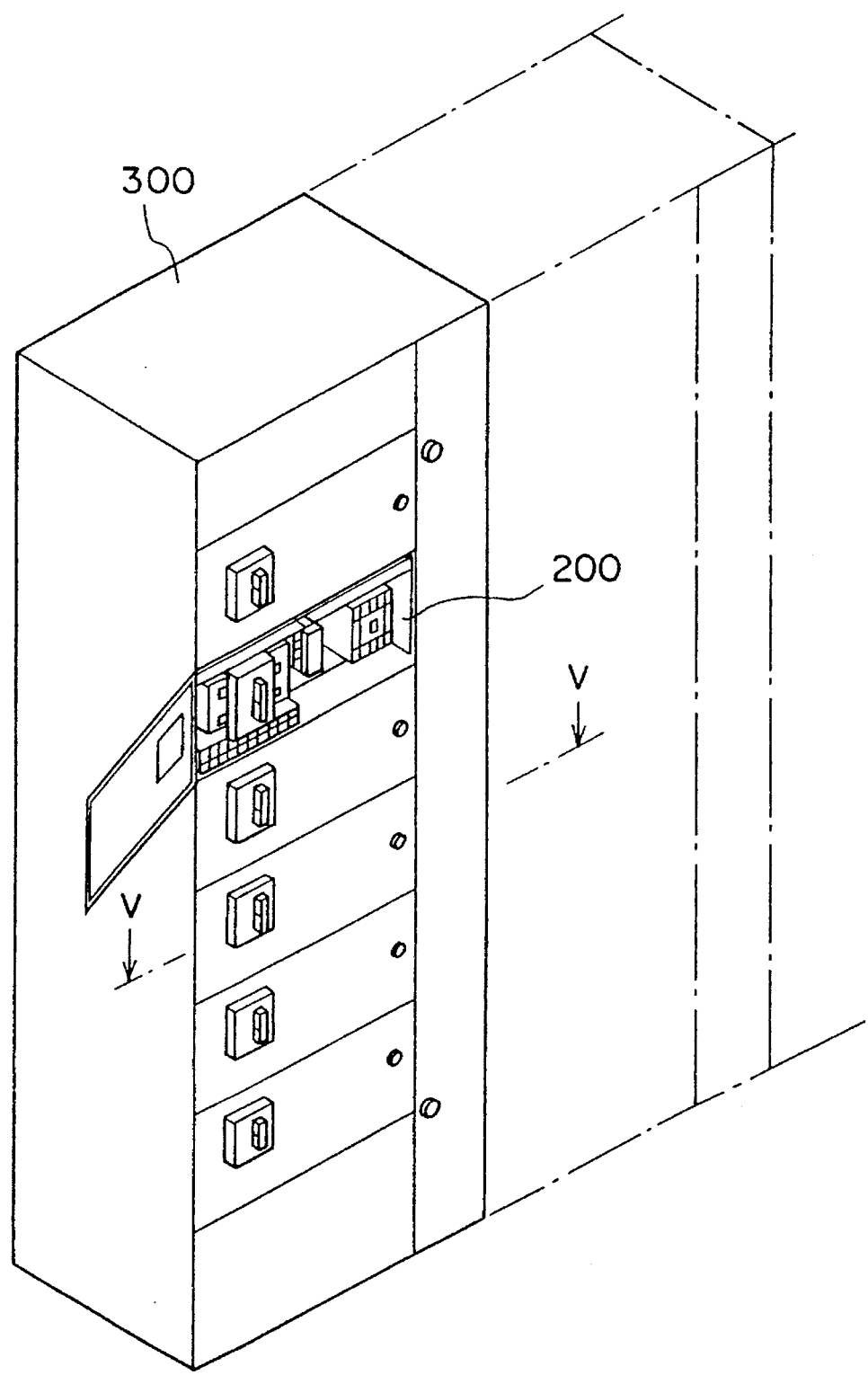
FIG. 1 is a perspective view showing an appearance of a control center.
Figure 2:
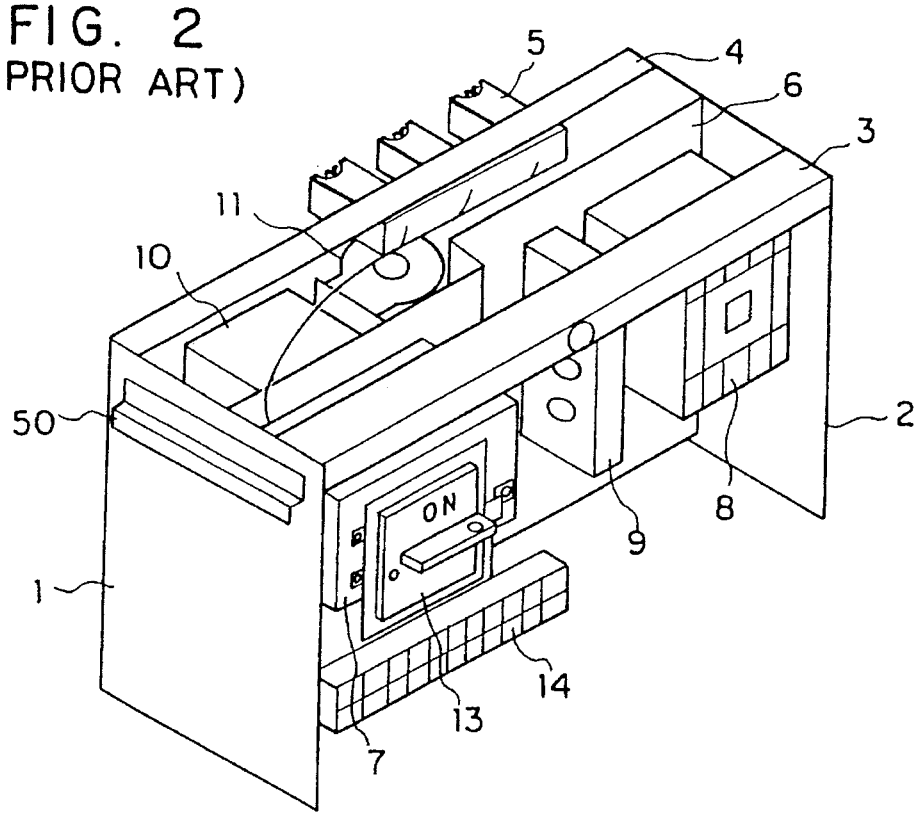
FIG. 2 is a perspective view of a control unit as seen from a front face thereof.
Figure 3:
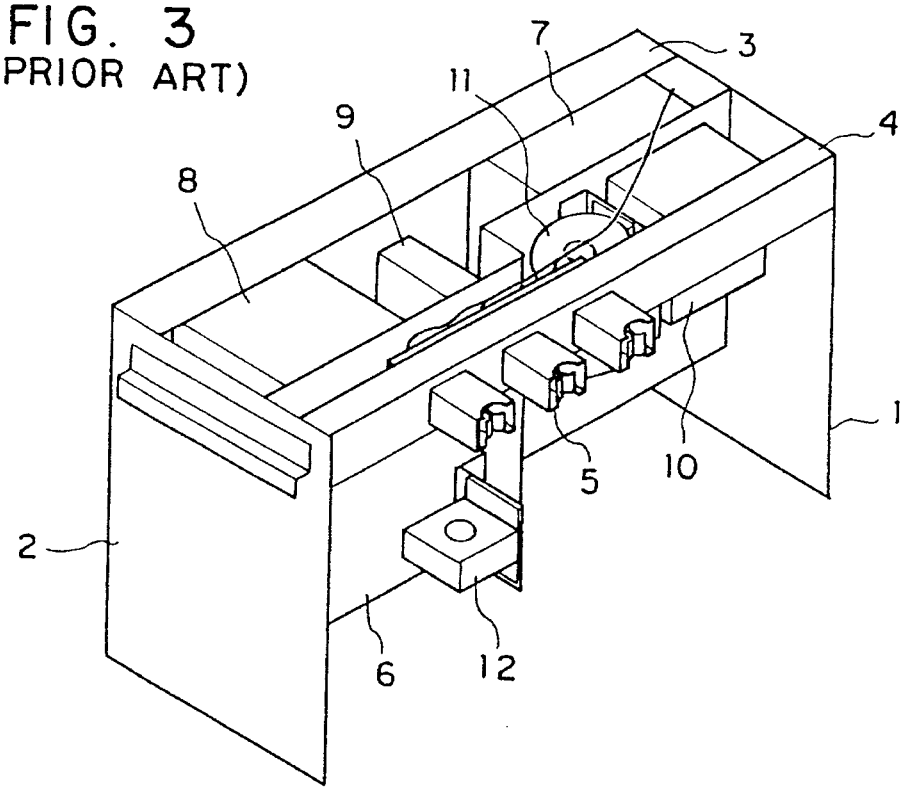
FIG. 3 is a perspective view of the control unit as seen from a back face thereof.
Figure 4:
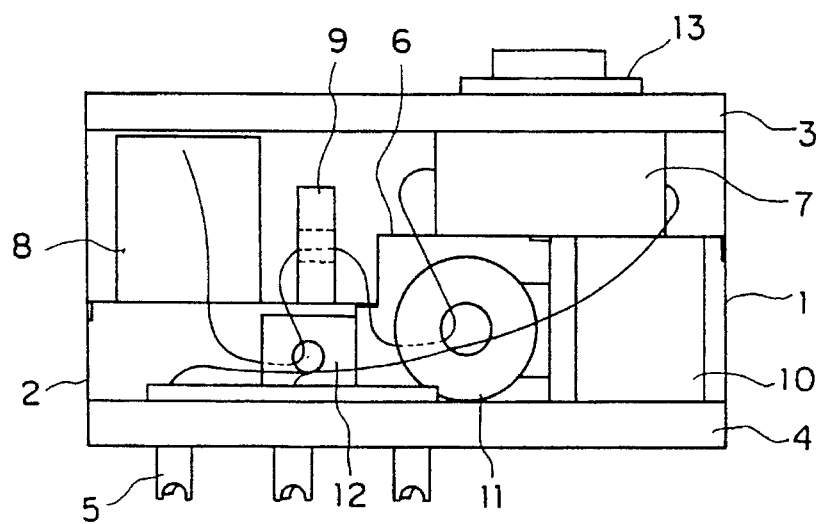
FIG. 4 is a plan view of the control unit as seen downward.
Figure 5:
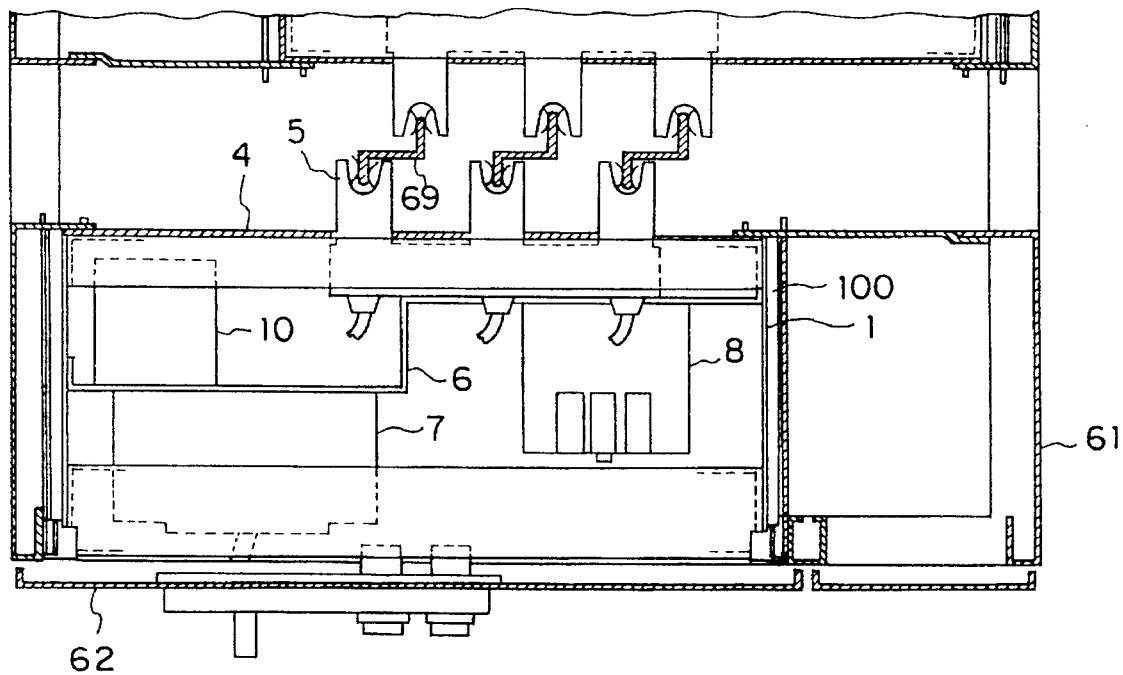
FIG. 5 is a sectional view taken along a line V—V of FIG. 1, showing a control center box.
Figure 6:
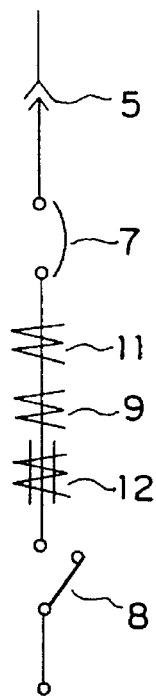
FIG. 6 is a connection diagram showing a main circuit wiring in the control unit.
Figure 7:
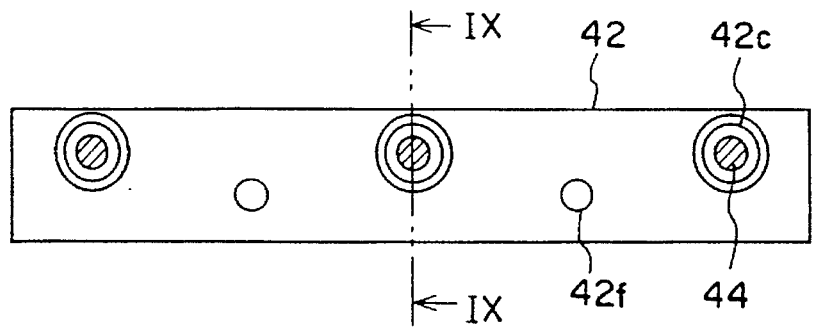
FIG. 7 is a front view showing a plug-in unit.
Figure 8:
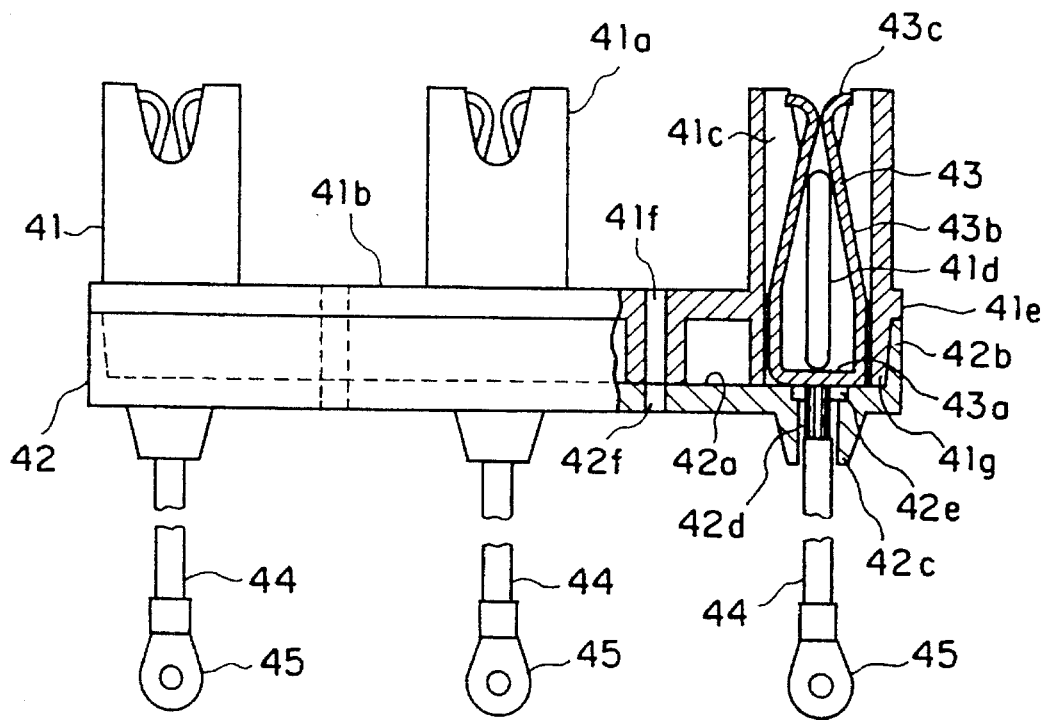
FIG. 8 is a plan view partially broken away of the plug-in unit.
Figure 9:
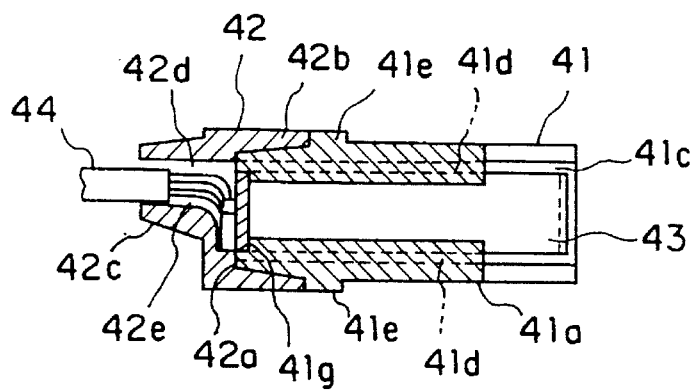
FIG. 9 is a sectional view taken along a line IX—IX of FIG. 8.
Figure 10:
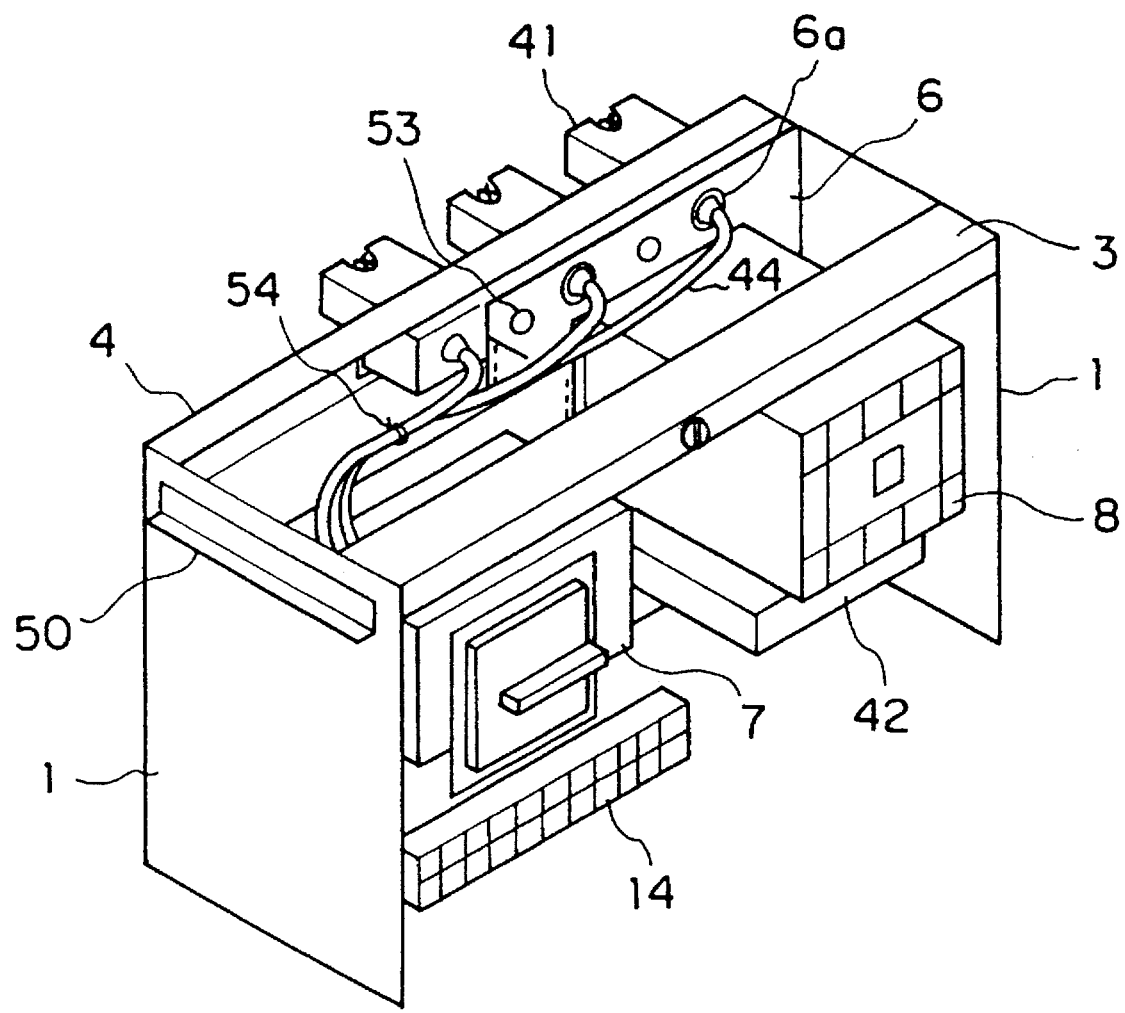
FIG. 10 is a perspective view of the control unit, illustrating a plug-in unit portion in detail.
Figure 11:
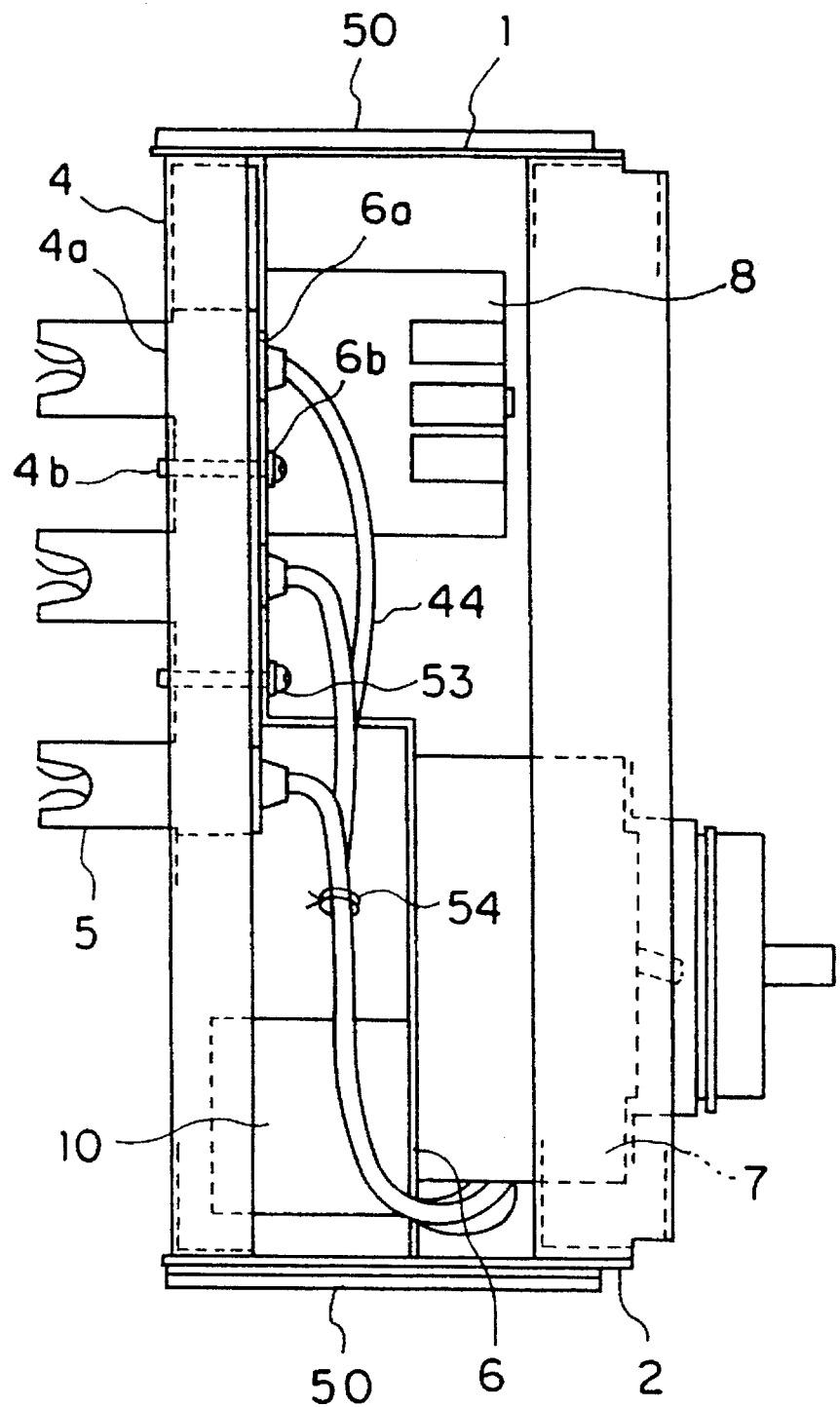
FIG. 11 is a plan view of the control unit shown in FIG. 10.
Figure 12:
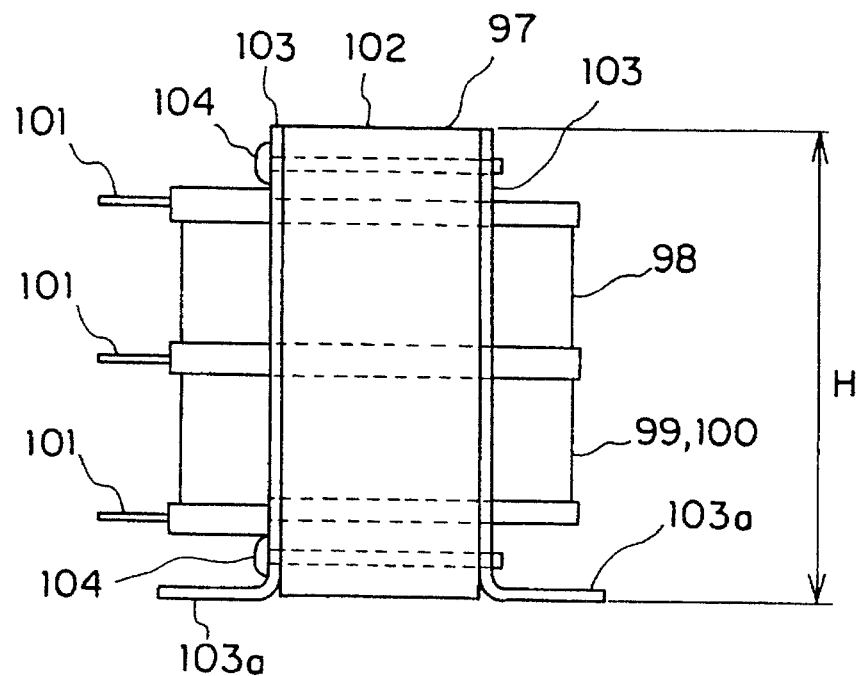
FIG. 12 is a top view of a conventional operating transformer.
Figure 13:
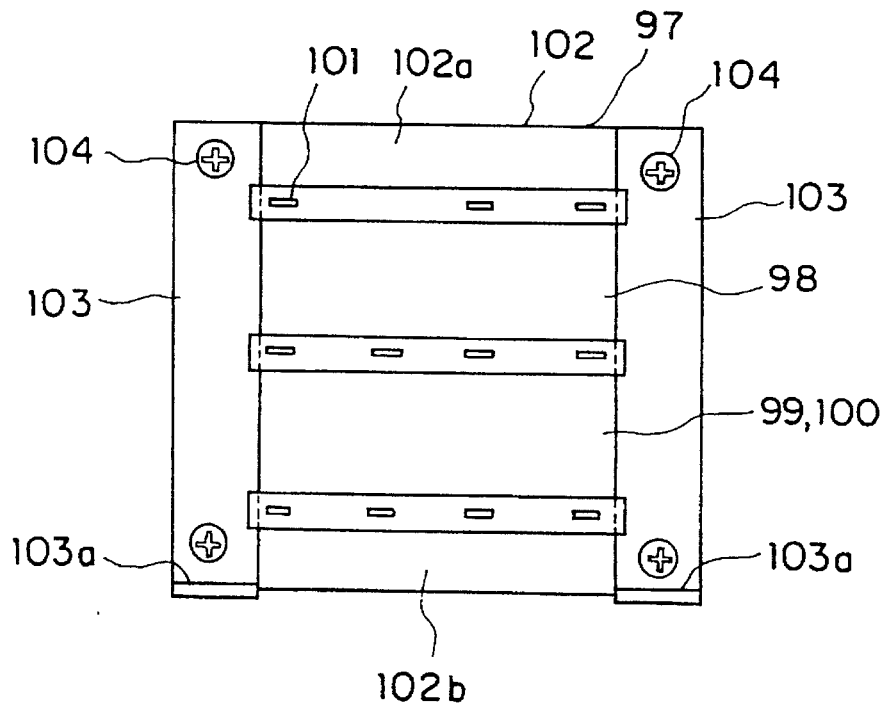
FIG. 13 is a left-side view of the conventional operating transformer.
Figure 14:
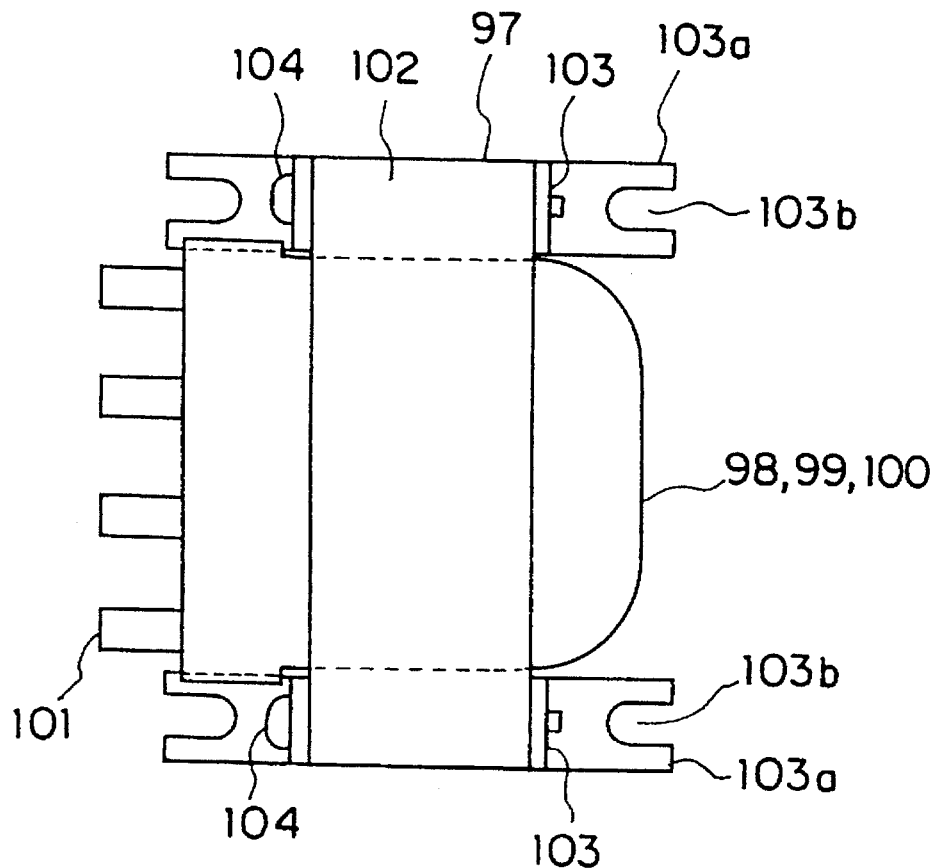
FIG. 14 is a plan view of the conventional operating transformer.

When a main circuit wiring as shown in FIG. 6 is established, a wiring is established in the order of a power source grip 5, the circuit breaker 7, the current transformer 11, the current sensor 9, the zero-phase current transformer 12, and the electromagnetic switch 8. In this case, as seen from FIG. 23, a wire is drawn from the back face of the unit to the front face, and is drawn to the back face according to the wiring order. Thus, a wiring operation can be more simplified. For example, only one operation can complete the wiring with respect to the current transformer 11, the current sensor 9, and the zero-phase current transformer 12.

Though a distance between the equipment mounting plate 16 and a back transverse member 4 is more reduced than that in a conventional unit, there is no problem. This is because the thin operating transformer 15 having a smaller depth dimension than that of the zero-phase current transformer 12 is attached to the back face of the right-side mounting portion 16c of the equipment mounting plate 16.

A distance between the equipment mounting plate 16 and a front transverse member 3 is a larger than that in the conventional unit. Consequently, it is possible to attach the electromagnetic switch 8 having a larger capacity and a larger dimension than those of a conventional electromagnetic switch. Further, the electromagnetic relay 17 and so forth can be easily contained. Since the bent portion 16a is longer than the conventional bent portion, it is possible to provide the same physical relationship between the left-side mounting portion 16b of the equipment mounting plate 16, the front transverse member 3, and the back transverse member 4 as a conventional physical relationship.

As set forth above, the equipment mounting plate 16 is disposed in the unit at a deeper position, the bent portion 16a is longer than the conventional bent portion, and the thin operating transformer 15 is attached to the back face of the right-side mounting portion 16c of the equipment mounting plate 16. As a result, it is possible to contain the bulk electromagnetic switch 8 and other equipments without increasing the size of the control unit.

Further, since the operating transformer 15 is isolated from the other equipment, the other pieces of equipment are never affected in the event of burning accident of the operating transformer.

Embodiment 2

Figure 25:
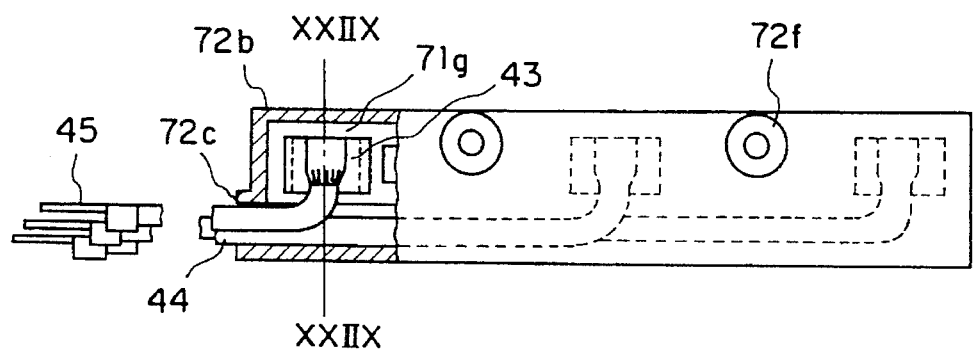
FIG. 25 is a front view partially broken away of a plug-in unit according to the embodiment 2 of the present invention.
Figure 26:
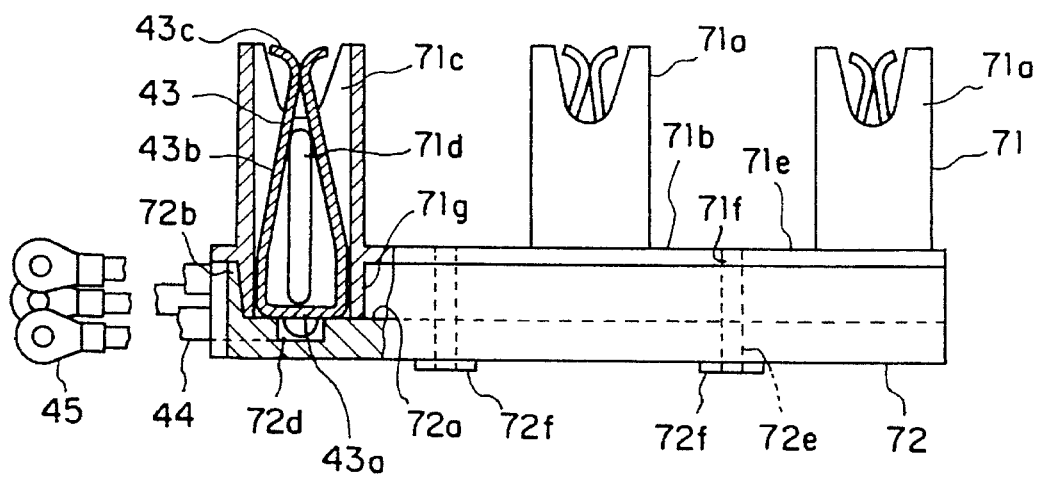
FIG. 26 is a plan view partially broken away of the plug-in unit.
Figure 27:
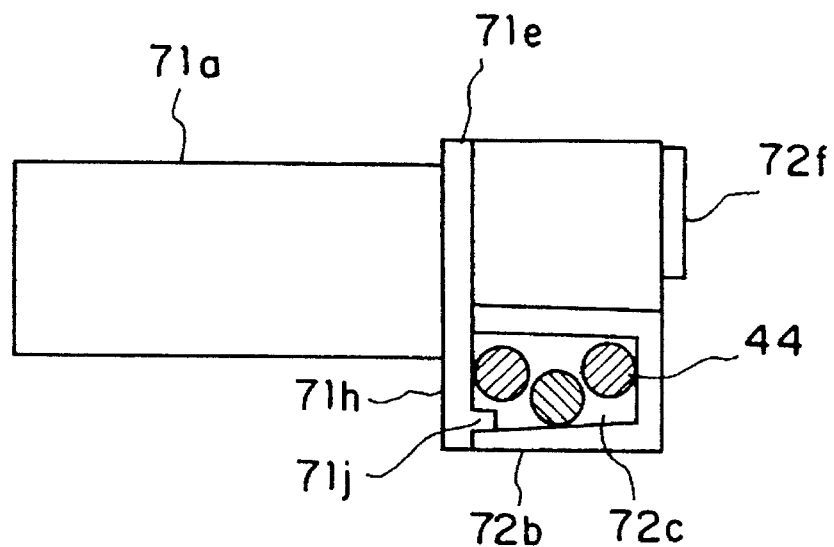
FIG. 27 is a left side view of the plug-in unit.
Figure 28:
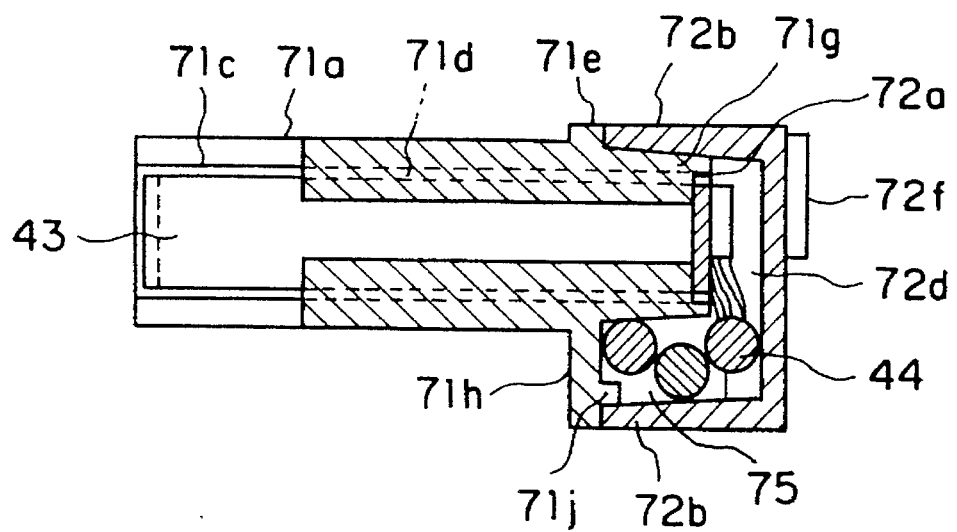
FIG. 28 is a sectional view taken along a line XXIIX—XXIIX of FIG. 25, illustrating the plug-in unit.
Figure 29:
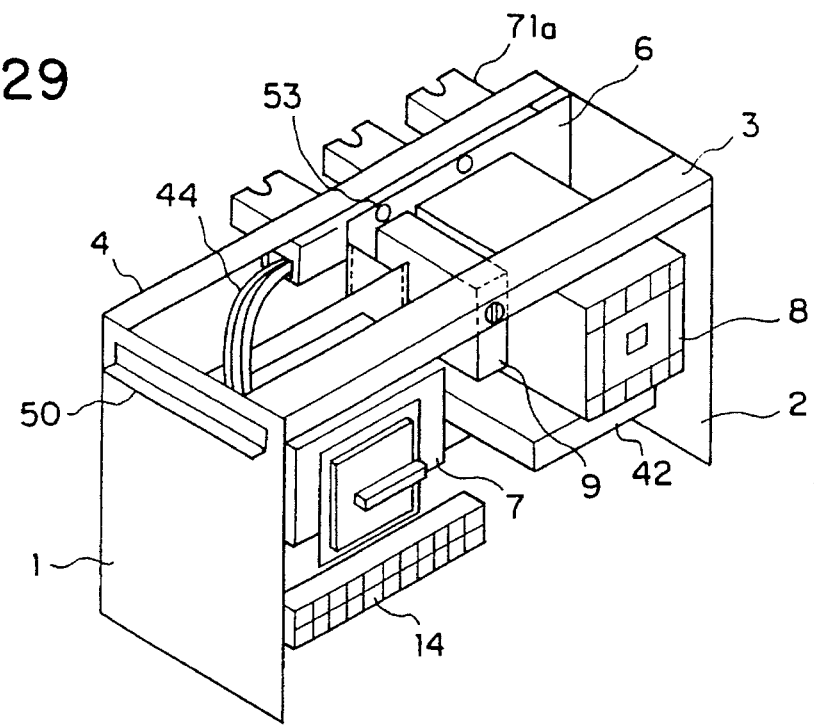
FIG. 29 is a perspective view of the control unit, illustrating a plug-in unit portion in detail.
Figure 30:
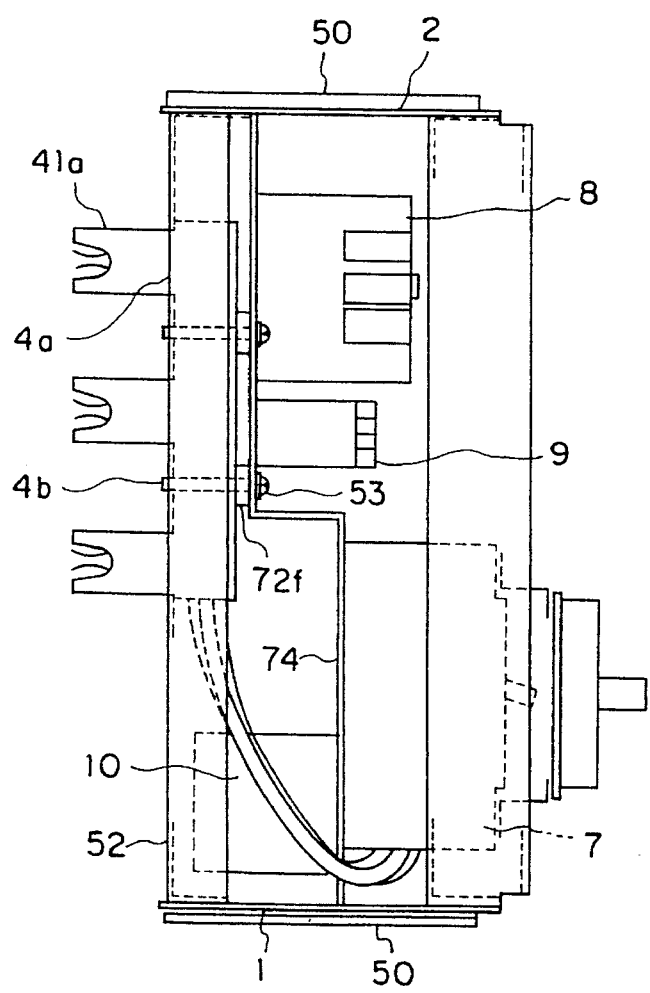
FIG. 30 is a plan view of the control unit shown in FIG. 29.

FIG. 25 is a front view partially broken away of a plug-in unit according to the embodiment 2 of the present invention, FIG. 26 is a plan view partially broken away of the plug-in unit, and FIG. 27 is a left side view of the plug-in unit. FIG. 28 is a sectional view taken along a line XXIIX—XXIIX of FIG. 25, illustrating the plug-in unit. FIG. 29 is a perspective view of the control unit 200, illustrating a plug-in unit portion in detail. FIG. 30 is a plan view of the control unit 200 shown in FIG. 29.

The plug-in unit includes a first insulating case 71, an elongatedly cover-shaped second insulating case 72 into which the first insulating case 71 is fitted, a lead wire 44, and a terminal 45. Three prismatic portions 71a and a connecting substrate portion 71b are integrally mounted to form the first insulating case 71. The three prismatic portions 71a realize the power source grips 5, respectively. The prismatic portion 71a includes a square hole-shaped chamber 71c, and an extending rod 71d vertically extends in the prismatic portion 71a through the chamber 71c. The prismatic portion 71a contains a U-shaped contact 43 having elasticity. The U-shaped contact 43 includes a base portion 43a, a pair of contact legs 43b upward extending in parallel from the base portion 43a to be inwardly inclined in the course of the extension, and a distal end 43c whose distal end is curved to outward extend. Flange portions 71e and 71h are mounted on a periphery of the connecting substrate portion 71b. In this case, one flange portion 71h has a longer width than that of the other flange portion 71e. An extending portion 71j extends from the flange portion 71h. Further, a mounting hole 71f is provided in the connecting substrate portion 71b.

A lead wire exit 72c is provided in one side surface of the cover-shaped second insulating case 72. An end surface of a cylindrical extending portion 71g of the first insulating case 71 contacts an inner bottom surface 72a of the cover-shaped second insulating case 72. One side portion 72b of the second insulating case 72 contacts side surfaces of the flange portion 71e and the extending portion 71g. The other side portion 72b of the second insulating case 72 contacts side surfaces of the flange portion 71h and the extending portion 71i. In this way, the first insulating case 71 is fitted with the second insulating case 72. In this case, the base portion 43a of the U-shaped contact 43 contacts the inner bottom surface 72a of the second insulating case 72. Further, when the first insulating case 71 is fitted with the second insulating case 72, a prismatic wiring chamber 75 is defined.

A concave groove portion 72d is provided in the inner bottom surface 72a of the second insulating case 72. A mounting hole 72e is provided in a bottom portion of the second insulating case 72 so as to correspond to the mounting hole 71f in the first insulating case 71. A cylindrical washer 72f is mounted at a periphery of the mounting hole 72e on the side opposed to the inner bottom surface 72a of the second insulating case 72.

A description will now be given of an assembling method of the plug-in unit. First, the contact 43 is inserted into the chamber 71c from the side of the extending portion 71g of the first insulating case 71. The terminal 45 is previously attached to an end of the lead wire 44, and the lead wire 44 is wired along one side surface of the extending portion 71g and the flange portion 71h. Next, one end of the lead wire 44 passes through the concave groove portion 72d to be connected to the outside of the base portion 43a of the contact 43 by resistance welding. Then, the first insulating case 71 is fitted with the second insulating case 72 so as to pass the lead wire 44 through the lead wire exit 72c.

Accordingly, the prismatic wiring chamber 75 is defined by the first insulating case 71 and the second insulating case 72. The contact 43 is anchored by the insulating cases in a state where the base portion 43a is interposed between the extending rod 71d and the inner bottom surface 72a of the insulating case 72. The lead wire 44 passes through the concave groove portion 72d, and the wiring chamber 75 to reach the lead wire exit 72c. Finally, three of the lead wires 44 outward extend from the lead wire exit 72c.

The plug-in unit is assembled as described above, and is pressed on the equipment mounting plate 6 and the back transverse member 4. Further, a fixing screw 53 is screwed into the mounting holes 72f, 71f. Since the cylindrical washer 72f is provided for the mounting holes in the plug-in unit, bottom portions of the insulating cases never tightly contact the equipment mounting plate 6. Therefore, the plug-in unit never interferes with the screws for mounting equipment such as electromagnetic switch 8. As a result, when the electromagnetic switch 8 and so forth are fixed with the screw at the back face of the equipment mounting plate 6, it is possible to extend a space where the screws are disposed.

As set forth above, in the plug-in unit, all the lead wires 44 pass through the wiring chamber 75 defined by the first insulating case 71 and the second insulating case 72 to outward extend from the lead wire exit 72c provided in the side surface of the second insulating case 72. This eliminates the need for passing the lead wires 44 through the through-holes. As a result, the terminal 45 can be previously attached to the end of the lead wire 44 to facilitate the assembly. Further, most of the lead wire 44 passes through the insulating cases, and an exposed portion of the lead wire 44 is reduced, resulting in a less bundling portion of wire. In addition, in the event of, for example, burning of the equipments attached to a lower portion of the plug-in unit, the lead wire 44 is not easily affected by the burning.

Embodiment 3

Figure 31:
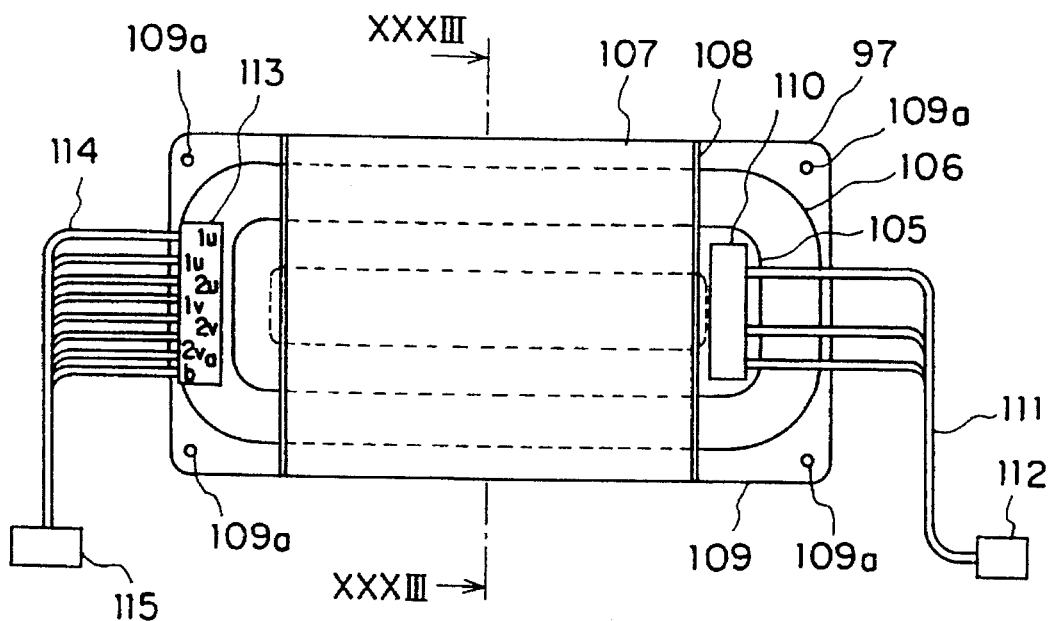
FIG. 31 is a front view of an operating transformer according to the embodiment 3 of the present invention.
Figure 32:
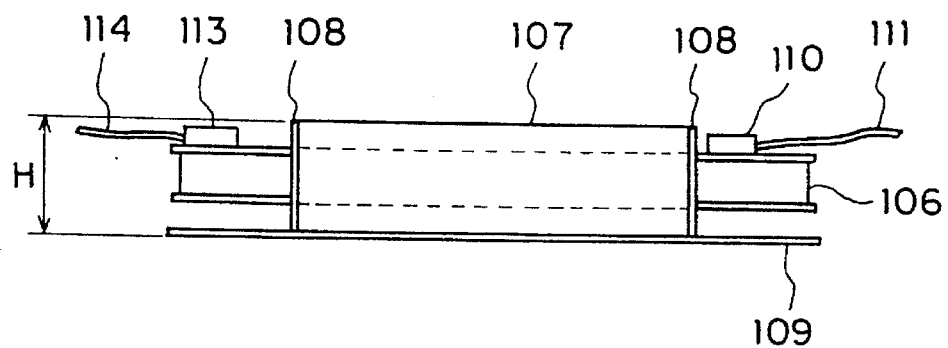
FIG. 32 is a side view of the operating transformer.
Figure 33:
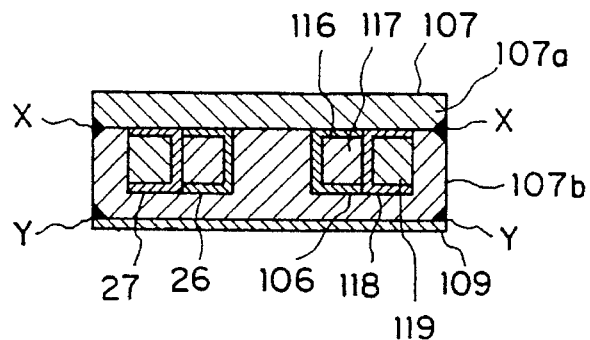
FIG. 33 is a sectional view taken along a line XXXIII—XXXIII of FIG. 31, illustrating the operating transformer.

FIG. 31 is a front view of an operating transformer according to the embodiment 3 of the present invention, and FIG. 32 is a side view thereof. FIG. 33 is a sectional view taken along a line XXXIII—XXXIII of FIG. 31, illustrating the operating transformer 10. In the drawing, reference numeral 105 designates a primary coil, 106 is a secondary coil and a tertiary coil. Since the secondary coil and the tertiary coil are mounted to form a ring, the coils are hereinafter referred to as secondary coil 106. Reference numeral 107 designates a core. Specifically, the core 107 is formed by layering plates punched out from a thin plate in a horizontal direction in FIG. 31.

Reference numeral 108 designates a pressing plate to clamp the core 107 from both sides thereof, and 109 is a contacting plate connected to a side surface of the core 107 along the layering direction of the core. The contacting plate 109 extends from a bottom surface of the core 107 on the right and left sides. Further, a mounting hole 109a is provided in an end of the contacting plate 109 to fix an operating transformer 10.

Reference numeral 110 designates a connecting portion mounted at a side portion of the primary coil 105. In the connecting portion 110, a lead wire led from the primary coil 105 is connected to an external outgoing line 111. The external outgoing line 111 is provided to correspond to each lead wire 126, and the other end of the external outgoing line 111 is connected to a connector 112. Reference numeral 113 designates a connecting portion mounted at a side portion of the secondary coil 106. In the connecting portion 113, a lead line led from the secondary coil 10 is connected to an external outgoing line 114. The external outgoing line 114 is provided to correspond to each lead line, and the other end thereof is connected to a connector 115. The connectors 112, 115 are connected to another connector connected to external wiring or a piece of equipment. Accordingly, a side portion of the operating transformer 10 does not require a special connecting portion for connection to other circuits or other equipments. That is, a connecting position can be optionally selected, resulting in an increased degree of freedom for arrangement of the equipment.

Figure 34:
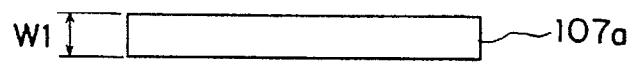
FIG. 34 is a front view showing a structure of one core piece forming a core.
Figure 35:
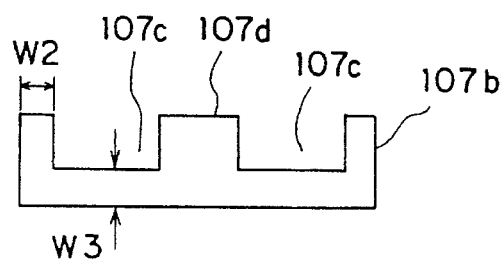
FIG. 35 is a front view showing a structure of the other core piece forming the core.

FIGS. 34 and 35 are front views showing structures of core pieces 107a, 107b forming the core 107. The core piece 107a has an I-shaped structure, and is formed by punching a sheet-like silicon steel plate. The core piece 107b has an E-shaped structure, and is formed by punching the sheet-like silicon steel plate. As shown in FIG. 33, in a certain layer of the core 107, the core piece 107a is disposed at an upper portion and the core piece 107b is disposed at a lower portion. In the next layer, the core piece 107b is disposed at an upper portion and the core piece 107a is disposed at a lower portion. In a similar manner, in the core 107, the core piece 107a and the core piece 107b are alternately disposed. This arrangement forms two coil inserting holes having a tetragonal section and passing through the core 107 in the core layering direction.

After the core pieces 107a and 107b are layered, linear welding is applied, between the pressing plate 108 at one end of the core 107 and the pressing plate 108 at the other end of the core 107, to a contact position between the core piece 107a and the core piece 107b, that is, to the X position in FIG. 33 while providing compressive force in the layering direction. Further, another linear welding is applied, between the pressing plate 108 at one end of the core 107 and the pressing plate 108 at the other end of core 107, to a contact position between the contacting plate 109 and the core 107, that is, to the Y position in FIG. 33.

The above fabricating method can eliminate the need for a screw 104 which has been conventionally required to clamp the core 107. A conventional transformer requires a hole through which the screw passes. Since the hole reduces a sectional area of magnetic path, it is necessary to extend the sectional area of the core 107 by an area corresponding to the reduced area. However, no screw hole is required in the present invention so that magnetic path widths W1, W2, and W3 of the core pieces 107a, 107b can be reduced.

When a height of the core 107 is more reduced to provide a thin transformer, the core 107 is extended in the layering direction. Consequently, strength of the core 107 is reduced with respect to a force applied from a direction perpendicular to the layering direction. However, in this case, the pressing plates 108 are provided to avoid reduction of the strength.

The primary coil 105 and the secondary coil 106 are disposed in the two through-holes which are defined by two notch portions 107c of the core 107. As shown in FIG. 33, a bobbin 116 for the primary coil and a bobbin 118 for the secondary coil are made of insulation resin, and pass through the two through-holes to be circulated. The bobbins 116, 118 are provided with a channel-shaped structure to have an opening portion in an outer peripheral direction. As shown in FIG. 33, the inside bobbin 116 is fitted into an inner diameter portion of the outside bobbin 118. A primary coil conductor 117 is wound on the bobbin 116, and a secondary coil conductor 119 is wound on the bobbin 118. The secondary coil 106 is positioned on the outside of the primary coil 105, and is disposed concentrically and coplanar with the primary coil 105.

Figure 36:
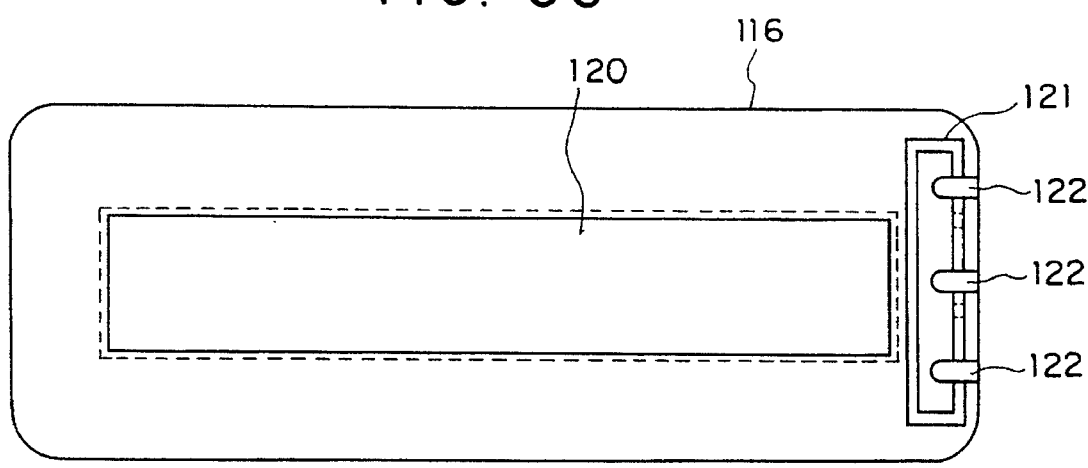
FIG. 36 is a plan view of one example of a bobbin.
Figure 37:
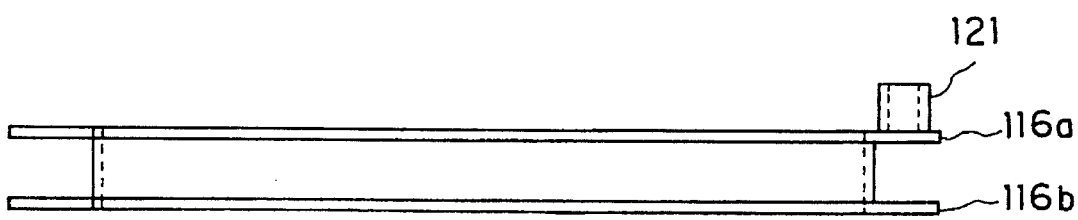
FIG. 37 is a side view of the bobbin.
Figure 38:
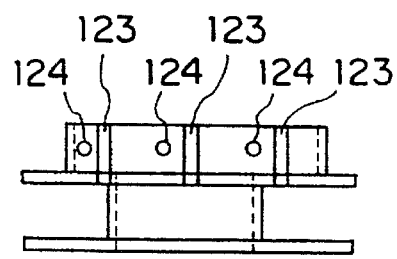
FIG. 38 is a right side view of the bobbin.
Figure 39:
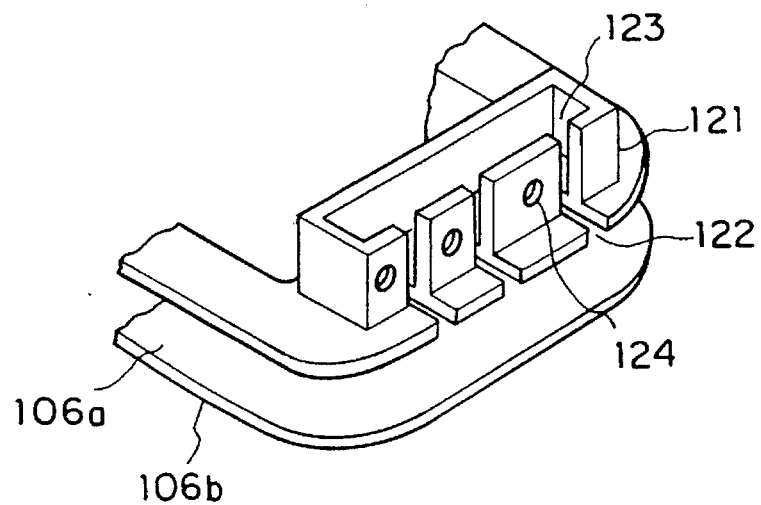
FIG. 39 is a perspective view of a connecting portion which is mounted on the bobbin.

FIG. 36 is a plan view of one example of the bobbin 116 for the primary coil. FIG. 37 is a side view of the bobbin. FIG. 38 is a right side view thereof. FIG. 39 is a perspective view of a connecting portion which is mounted on the bobbin 116. The bobbin 116 is annular, and has an upper flange 116a and a lower flange 116b. A hole is provided in a center portion of the bobbin 116, and a convex portion 107d of the core piece 107b passes through the hole. Upon the flange 116a, a box-shaped connecting portion cover 121 is integrally formed with the flange 116a to serve as the connecting portion 110. An upper portion of the connecting portion cover 121 is opened. A notch 122 is provided in the flange 116a to pass the lead line led out from the primary coil 105. A notch 123 is provided in one side surface of the connecting portion cover 121 at a position corresponding to the notch 122. Further, a through-hole 124 is also provided in the one side surface of the connecting portion cover 121 to pass the external outgoing line 111.

The bobbin 118 for the secondary coil has the same structure as that of the bobbin 116 for the primary coil except its outer dimension and the number of lead lines.

Winding operation of the coil conductors 117 and 119 can be facilitated by using the bobbins 116, 118. Since outer and inner dimensions and thickness dimensions of the respective coils 105, 106 become constant, the coils 105 and 106 can be easily mounted to the core 107.

Figure 40:
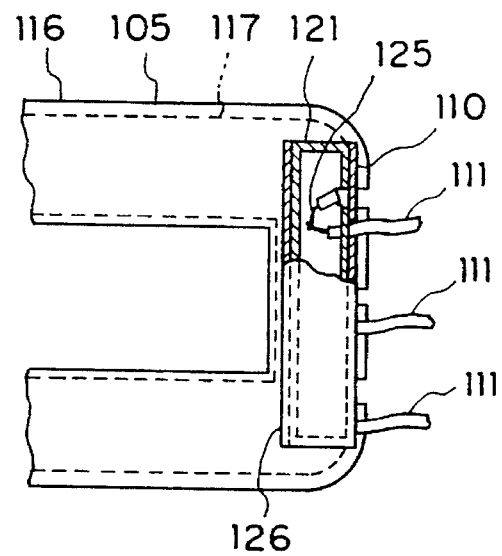
FIG. 40 is a front view partially broken away of a side portion of a primary coil.
Figure 41:
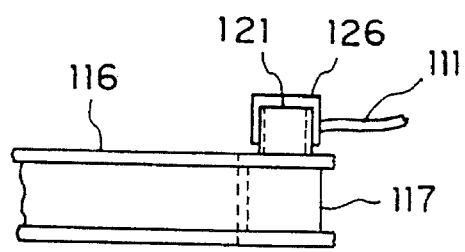
FIG. 41 is a side view of the side portion of the primary coil.

FIG. 40 is a front view partially broken away of a side portion of the primary coil 105. FIG. 41 is a side view of the side portion of the primary coil 105. As shown in the drawing, a cover portion 126 is arranged on the upper portion of the connecting portion cover 121. FIGS. 40 and 41 indicate a lead wire 125 led out from the primary coil conductor 117.

Figure 42:
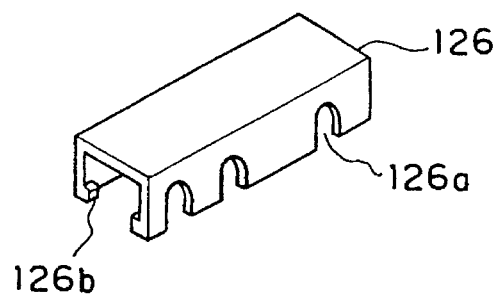
FIG. 42 is a perspective view of a cover portion.

The lead wire 125 is soldered to the external outgoing line 111 in the connecting portion cover 121. Thereafter, the cover portion 126 is mounted on the upper portion of the connecting portion cover 121. FIG. 42 is a perspective view of the cover portion 126. A notch 126a is provided in a side surface of the cover portion 126 to pass the external outgoing line 111. A lower portion of the side surface is provided with an anchoring portion 126b to anchor the connecting portion cover 121.

As set forth above, since the connecting portion is mounted at the side portion of the coil, it is possible to concentrically and coplanarly dispose the primary coil 105 and the secondary coil 106. The connecting portion outward extend so as not to exceed the secondary coil 106, resulting in a small core size as a whole. Since the connecting portion is mounted at the side portion of the coil, it is possible to easily vary a length of the external outgoing line 111. The length of the external outgoing line 111 is possibly varied depending upon various requirements. Further, the box-shaped connecting cover 121 realizes the connecting portion to surely protect the connection portion.

As shown in FIG. 32, a height of the connecting portion 110 including the connecting portion cover 121 is lower than a top plane of the core 107, and the external outgoing line 111 is led out in a transverse direction of the transformer. Consequently, the control unit 200 requires only the sum of thicknesses of the core 107 and the contacting plate 109 as a height of the containing space for the operating transformer 10. That is, the control unit 200 can be more downsized.

Figure 15:
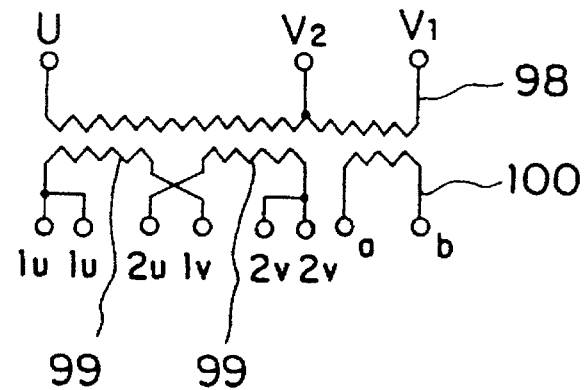
FIG. 15 is a connection diagram showing an exemplary connection inside the operating transformer.
Figure 16:
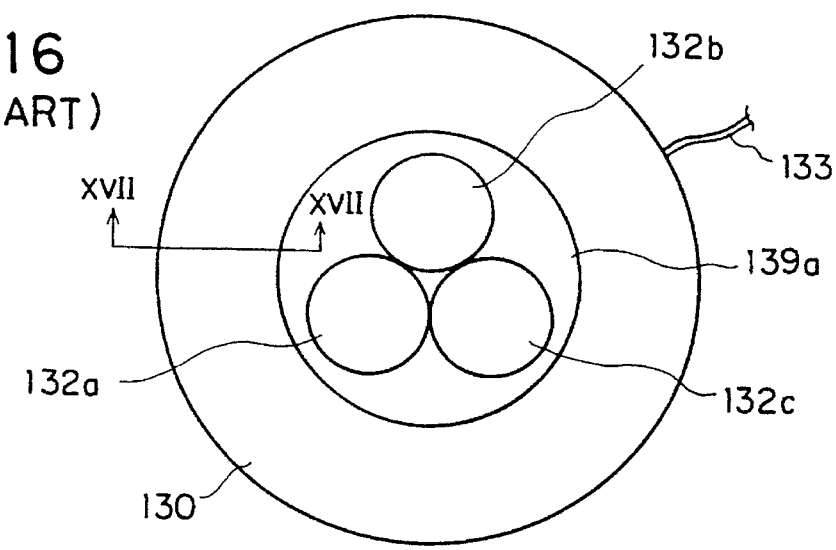
FIG. 16 is a front view showing a conventional circular zero-phase current transformer.

A description has been given of a case where two secondary coils and one tertiary coil shown in FIG. 15 are realized by one coil 106. However, for example, the three coils may be separately realized. In this case, bobbins are employed to correspond to the respective coils.

The connecting portion includes the cover portion 126, and the connecting portion cover 121 integrally mounted with the flange 116a. However, the connecting portion cover 121 may be fabricated as an independent part, and may be secured to the flange 116a by, for example, adhesion.

Though a description has been given of a case the lead wire 125 is soldered to the external outgoing line 111 in the connecting portion cover 121, a terminal block or a connector may be mounted instead of the connecting portion cover 121. In this case, a connecting operation is facilitated. As shown in FIG. 31, if a terminal marking is provided for a surface of the cover portion 126, it is possible to provide a transformer which can avoid an erroneous connection and can be more easily wired. Wiring between the connecting portion cover 121, the connectors 111 and 115 may be established by different wires, or by one line including the different wires such as multicore line or flat cable.

Further, it must be noted that a welding position in the core 107 should not be limited to the X and Y portions in FIG. 33. If all the core pieces can be welded between both the ends in the layering direction of the core 107, the welding line is not necessarily a straight line, and may be a curve, a zigzag line, or the like.

Further, in a physical relationship between the primary coil 105 and the secondary coil 106, the secondary coil 106 may be disposed inside, and the primary coil 105 may be disposed outside.

Embodiment 4

Figure 17:
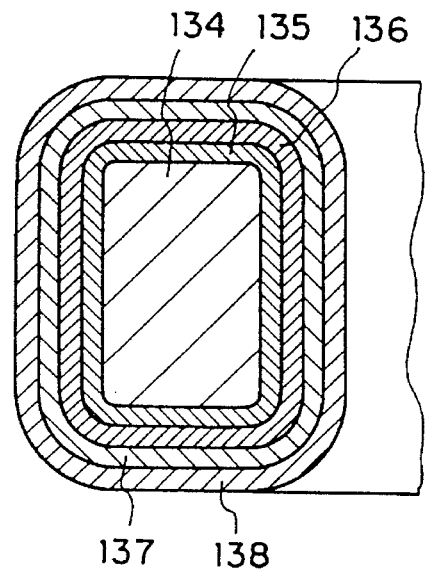
FIG. 17 is a sectional view taken along a line XVII—XVII of FIG. 16.
Figure 18:
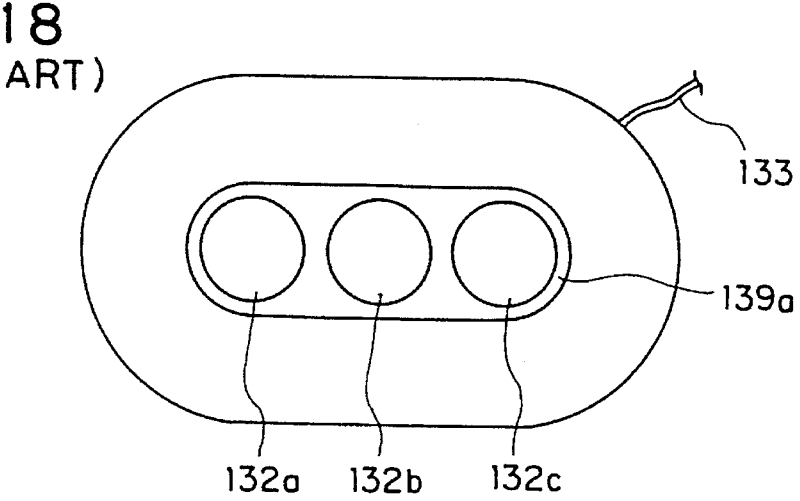
FIG. 18 is a front view showing a conventional track type zero-phase current transformer.
Figure 43:
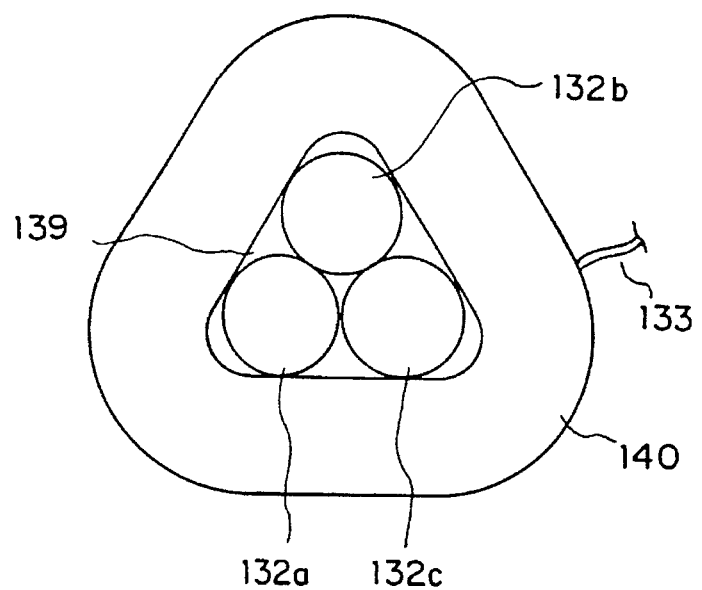
FIG. 43 is a front view showing a zero-phase current transformer according to the embodiment 4 of the present invention.

FIG. 43 is a front view showing a zero-phase current transformer according to the embodiment 4 of the present invention. The zero-phase current transformer has the same sectional structure as that shown in FIG. 17. As shown in FIG. 43, the zero-phase current transformer includes a coil portion 140 having a substantially regular triangle-shaped transverse section whose vertical angle is rounded, and a cable inserting aperture 139 serving as a space on the inside of the coil portion 140 to have a substantially regular triangle-shaped section whose vertical angle is rounded. As shown in FIG. 17, the coil portion 140 includes an annular core 134 made of a magnetic material having high magnetic permeability, a vibration isolating material 135 covering the core 134, a containing case 136 containing the core 134 and the vibration isolating material 135, a winding (secondary winding) wound on the containing case 136, and an insulating material 138 covering the winding 137.

Three-phase lines (primary conductor) 132a, 132b, and 132c corresponding to a primary winding pass through the cable inserting aperture 139. Signal voltage according to ac current in the primary conductors 132a, 132b, and 132c is outputted through magnetic coupling to a lead wire 133 connected to the winding 137.

Unlike a conventional track type zero-phase current transformer, the substantially regular triangle-shaped section can eliminate the need for a large space in one direction. Further, in a circular zero-phase current transformer, the three primary conductors are disposed in a substantially regular triangle-shaped structure so that a large gap is formed between the primary conductors and a shape of the cable inserting aperture 139. However, the zero-phase current transformer according to the embodiment can reduce the gap. In addition, it is possible to provide a downsized and lightened zero-phase current transformer by removing an unnecessary swelling portion in a shape. As a result, a control unit 200 can be made smaller.

Besides, the coil portion having the substantially regular triangle-shaped section is provided with the substantially regular triangle-shaped cable inserting aperture 139 in which the three primary conductors 132a, 132b, and 132c are disposed in a substantially regular triangle-shaped structure. Therefore, the zero-phase current transformer has a more enhanced balance characteristic as that of the conventional zero-phase current transformer. It is also possible to provide a stable inserting state of the primary conductors 132a, 132b, and 132c, resulting in a stable characteristic.

A description will now be given of what extent the zero-phase current transformer is made smaller, with reference to specific values. It is assumed that the primary conductors 132a, 132b, and 132c have a diameter of 20 mm, and the coil portion has a thickness of 20 mm. In this case, in the circular zero-phase current transformer, an outer diameter is 84 mm, and an inner diameter is 44 mm. As a result, the zero-phase current transformer requires a height of 84 mm, and a lateral width of 84 mm. However, the zero-phase current transformer according to the present invention requires a height of 78 mm, and a lateral width of 72 mm. That is, the reduced height is 93% of the conventional height, and the reduced lateral width is 86% of the conventional lateral width.

As a secondary effect, there is an effect in that an average magnetic path of the core becomes shorter. That is, while the circular zero-phase current transformer has the average magnetic path length of 201 mm, the zero-phase current transformer has the average magnetic path length of 123 mm, resulting in 61% reduction of the conventional length.

Embodiment 5

Figure 44:
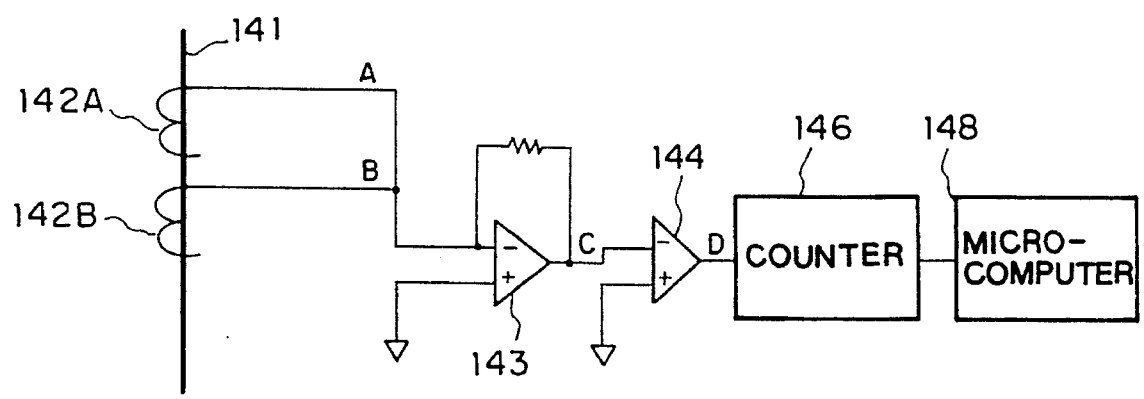
FIG. 44 is a block diagram showing a structure of a frequency measuring circuit according to the embodiment 5 of the present invention.

FIG. 44 is a block diagram showing a structure of a frequency measuring circuit according to the embodiment 5 of the present invention. In the drawing, reference numeral 141 designates a line, 142A and 142B are respectively voltage transformers to derive voltage having difference phases in the line 141, 143 is an inverting adder to add A-phase input voltage and B-phase input voltage. Reference numeral 144 is a comparator to convert an output from the inverting adder 143 into a rectangular wave, 146 is a counter to count a time for one period of the rectangular wave outputted from the comparator 144, and 148 is a microcomputer to compute a frequency depending upon a counted value of the counter 146. Only the counted value of the counter 146 is inputted into the microcomputer 148 so that the microcomputer 148 does not perform control for switch-over of an input port. Further, period signal generating means is realized by the inverting adder 143 and the comparator 144. Frequency computing means is realized by the counter 146 and the microcomputer 148.

Figures 45A, 45B, 45C, 45D:
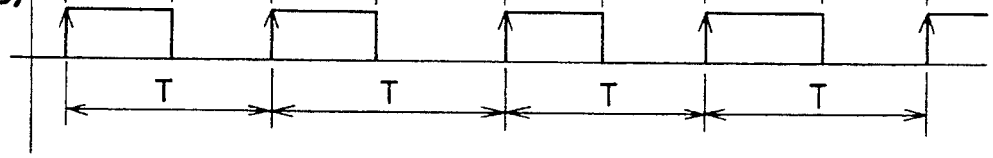
FIG. 45 is a timing diagram showing a signal waveform for each part in the frequency measuring circuit according to the embodiment 5.

A description will now be given of the operation with reference to a timing diagram of FIG. 45. For example, an A-phase and a B-phase are deviated with a phase difference of 60 degrees. As shown in a left half of FIG. 45(C), the inverting adder 143 outputs an inverted value of a value obtained by adding the A-phase input voltage and B-phase input voltage. According to a physical relationship of the A-phase and the B-phase, the added value has a frequency identical with those of the A-phase and the B-phase. That is, when the A-phase and the B-phase are available, the inverting adder 143 has a phase different from phases of the A-phase and the B-phase, but has an output frequency identical with the frequencies of the A-phase and the B-phase.

Output from the inverting adder 143 is fed into one input terminal of the comparator 144. Reference voltage is fed into the other input terminal of the comparator 144. The reference voltage means voltage, for example, corresponding to voltage at a zero-cross point of the input voltage. As shown in FIG. 44(D), the comparator 144 provides a high level output when an instantaneous value of the input voltage is greater than the reference value.

The counter 146 counts a reference clock to feed the microcomputer 148 with a counted value for a period from a rise to the next rise of output from the comparator 144. That is, the counted value corresponds to the period of the input voltage of the counter 146. It must be noted that the counter 146 may feed the microcomputer 148 with a counted value for a period from a fall to the next fall of the output from the comparator 144. The microcomputer 148 obtains the period of the input voltage depending upon the counted value from the counter 146, and a frequency of the reference clock fed to the counter 146. Further, the microcomputer 148 can obtain a frequency of the input voltage, which is the reciprocal of the period. The frequency of the input signal from the counter 146 corresponds to the frequencies of the A-phase and the B-phase. Thus, the microcomputer 148 can obtain a frequency of an electric power system.

In a case where the A-phase voltage is interrupted due to occurrence of accident and so forth, the output from the inverting adder 143 serves as an inverted value of the B-phase input voltage. Accordingly, the comparator 144 outputs a rectangular wave having a frequency corresponding to the frequency of the B-phase input voltage. The counter 146 outputs a counted value corresponding to the period of the B-phase input voltage. Then, the microcomputer 148 can continue frequency measurement with respect to the B-phase input voltage. As set forth above, in the frequency measuring circuit according to the embodiment, the microcomputer 148 can continue the frequency measurement without switch-over of input in the event of accident. Further, the frequency measuring circuit requires only one counter 146.

When the A-phase voltage is interrupted, slight deviation occurs in a period of rise fed for the counter 146. This causes deviation in a period recognized by the microcomputer 148, resulting in a frequency measurement error. The microcomputer 148 carries out the frequency measurement for a plurality of continuous periods so as to reduce the frequency measurement error. The microcomputer 148 performs filtering processing to remove the maximum value and the minimum value in each frequency value, and average the remaining values. The processing is also performed in a conventional frequency measuring circuit.

As set forth above, the frequency measuring circuit includes the period signal generating means having the adder to add the electromotive forces having desired two phases, and a comparator to carry out binarization of the output from the adder, and output a rise portion or a fall portion in the binary signal as a signal indicating a period starting point. Consequently, there are effects in that it is possible to continue the frequency measurement without the switch-over of the input in the event of accident, and to easily generate a signal indicating the period starting point of a signal corresponding to a synthesized signal of the electromotive forces having two phases.

Embodiment 6

FIG. 46 is a block diagram showing a structure of a frequency measuring circuit according to the embodiment 6 of the present invention. In the drawing, reference numeral 144A designates a first comparator to convert A-phase input voltage from a voltage transformer 142A into a rectangular wave, 144B is a second comparator to convert B-phase input voltage from a voltage transformer 142B into a rectangular wave, and 145 is an OR circuit in which output from the first comparator and output from the second comparator are ORed. Other component parts are identical with those shown in FIG. 44. Period signal generating means is realized by the first comparator 144A, the second comparator 144B, and the OR circuit 145.

A description will now be given of the operation with reference to a timing diagram of FIG. 47. For example, an A-phase and a B-phase are deviated with a phase difference of 60 degrees. The A-phase input voltage is a sinusoidal wave voltage as shown in FIG. 47(A), and is fed from the voltage transformer 142A into one input terminal of the first comparator 144A. Reference voltage is fed into the other input terminal of the first comparator 144A. As shown in FIG. 47(E), the first comparator 144A provides a high level output when an instantaneous value of the A-phase input voltage is greater than the reference value. Similarly, as shown in FIG. 47(B), the second comparator 144B provides a high level output when an instantaneous value of the B-phase input voltage is greater than the reference value.

The OR circuit 145 outputs a signal shown in FIG. 47(G) according to the OR of the output from the first comparator 144A and the output from the second comparator 144B. A period between two rises in the signal is equal to periods of the A-phase and the B-phase. A counter 146 and a microcomputer 148 compute a frequency as in the case of the embodiment 5.

In case the A-phase voltage is interrupted due to occurrence of accident and so forth, only the output from the second comparator 144B is fed into the OR circuit 145. That is, a rectangular wave corresponding to only the B-phase input voltage is inputted into the second comparator 144B. Then, the microcomputer 148 can continue frequency measurement with respect to the B-phase input voltage. As set forth above, in the frequency measuring circuit according to the embodiment, the microcomputer 148 can continue the frequency measurement without switch-over of input in the event of accident.

As set forth above, the frequency measuring circuit includes period signal generating means having the first comparator to carry out binarization of one of electromotive forces having desired two phases, a second comparator to carry out binarization of the other of the electromotive forces, and an OR circuit in which the output from the first comparator and the output from the second comparator are ORed to output the OR. Consequently, there are effects in that it is possible to continue the frequency measurement without the switch-over of the input in the event of accident, and to easily generate a signal indicating the period starting point of a signal corresponding to a synthesized signal of the electromotive forces having two phases.

While preferred embodiments of the invention have been described using specific terms, such description is for illustrative purposes only, and it is to be understood that changes and variations may be made without departing from the spirit or scope of the following claims.

What is claimed is:

1. A plug-in unit serving as a connecting unit for feeding electric power to a control unit, including an insulating case containing a plurality of contacts respectively connected to lead wires, and said plug-in unit comprising:

a first insulating case having a plurality of contact chambers containing said contacts;

a second insulating case fitted with said first insulating case so as to form a wiring chamber between said first and said second insulating cases which wiring chamber extends in a direction perpendicular to a direction of extension of said contact chambers containing said contacts so as to extend across one end of said plurality of contact chambers; and one lead wire exit provided in a side formed by said two insulating cases through which said lead wires from each of said contact chambers exit.

2. A plug-in unit according to claim 1, wherein an extending washer is mounted at a periphery of a fixing screw hole which is provided on a surface of said second insulating case on the side to be secured to an equipment mounting plate.

3. A plug-in unit according to claim 1, wherein said first insulating case comprises:

a cylindrical extending portion having an end surface which contacts an inner bottom surface of said second insulating case, and a first flange extending outwardly of said cylindrical extending portion, said first flange comprising a second flange extending substantially parallel to said cylindrical extending portion over at least a portion of said first flange.

4. A plug-in unit according to claim 3, wherein said second insulating case comprises:

a first side portion which contacts a side surface of said first flange and said cylindrical extending portion; and a second side portion which contacts a side surface of said first flange and said second flange.

* * * * *